(12) United States Patent
Lee et al.

(10) Patent No.: US 11,006,045 B2
(45) Date of Patent: May 11, 2021

(54) ELECTRONIC DEVICE FOR ADJUSTING IMAGE INCLUDING MULTIPLE OBJECTS AND CONTROL METHOD THEREOF

(71) Applicant: Samsung Electronics Co., Ltd., Gyeonggi-do (KR)

(72) Inventors: Hwajun Lee, Gyeonggi-do (KR); Saebyuk Sheen, Gyeonggi-do (KR); Jaehan Lee, Gyeonggi-do (KR); Jiyeon Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/535,171

(22) Filed: Aug. 8, 2019

(65) Prior Publication Data
US 2020/0053293 A1 Feb. 13, 2020

(30) Foreign Application Priority Data

Aug. 8, 2018 (KR) .................. 10-2018-0092724

(51) Int. Cl.
*H04N 5/232* (2006.01)
*G06F 3/0482* (2013.01)
(Continued)

(52) U.S. Cl.
CPC ..... *H04N 5/232935* (2018.08); *G06F 3/0482* (2013.01); *G06F 3/0486* (2013.01); *G06F 3/04845* (2013.01); *H04N 5/232941* (2018.08)

(58) Field of Classification Search
CPC ....... H04N 5/232935; H04N 5/232941; H04N 5/23222; H04N 5/23218; G06F 3/0486; G06F 3/0482; G06F 3/04845
See application file for complete search history.

(56) References Cited

U.S. PATENT DOCUMENTS 9,230,355 B1 * 1/2016 Ahuja .................. G06F 3/0485
2005/0041103 A1 * 2/2005 Kinjo ................. H04N 1/00244
348/207.1
(Continued)

FOREIGN PATENT DOCUMENTS

JP 2004-208281 A 7/2004
JP 2016-34135 A 3/2016
(Continued)

OTHER PUBLICATIONS

International Search Report dated Nov. 21, 2019.

*Primary Examiner* — Nhan T Tran
(74) *Attorney, Agent, or Firm* — Cha & Reiter, LLC.

(57) ABSTRACT

An electronic device is disclosed, including a display, a camera, and at least one processor. The processor implements the method, including displaying a first preview image acquired through the camera on the display, identifying a category for each object included in the first preview image, applying adjustment filters to each object, each adjustment filter selected based on the identified category, display a second preview image on the display, in which each object is visually altered by the applied adjustment filters, displaying on the second preview image a plurality of selectable icons each corresponding to one of the identified categories, in response to receiving a first input selecting a first selectable icon, removing application of a first adjustment filter from a first object belonging to a category corresponding to the first selectable icon.

20 Claims, 22 Drawing Sheets

(51) Int. Cl.
    *G06F 3/0484*    (2013.01)
    *G06F 3/0486*    (2013.01)

(56)         References Cited

U.S. PATENT DOCUMENTS

2013/0207997 A1    8/2013  Berger et al.
2014/0092292 A1    4/2014  Kuznetsov
2018/0262708 A1    9/2018  Lee et al.
2019/0238759 A1 *  8/2019  Ahn ......................... G06N 3/08
2019/0279345 A1 *  9/2019  Kim ..................... G06K 9/6256

FOREIGN PATENT DOCUMENTS

KR    10-2016-0135435 A     11/2016
KR    10-2017-0021038 A      2/2017
KR        10-1728724 B1      4/2017
KR    10-2018-0051367 A      5/2018
KR         20180051367  *    5/2018  ............... G06T 5/00

* cited by examiner

ELECTRONIC DEVICE FOR ADJUSTING IMAGE INCLUDING MULTIPLE OBJECTS AND CONTROL METHOD THEREOF

CROSS-REFERENCE TO RELATED APPLICATION(S)

This application is based on and claims priority under 35 U.S.C. 119 to Korean Patent Application No. 10-2018-0092724, filed on Aug. 8, 2018, in the Korean Intellectual Property Office, the disclosure of which is herein incorporated by reference in its entirety.

TECHNICAL FIELD

The disclosure relates to an electronic device for adjusting an image including multiple objects and a control method thereof.

BACKGROUND

Various services and additional functions provided by electronic devices, for example, portable electronic devices such as smartphones, have gradually increased. In order to increase the effective value of such electronic devices and satisfy various needs of users, electronic device manufacturers provide various functions and have competitively developed electronic devices in order to differentiate them from other companies. Therefore, various functions provided by electronic devices have also gradually become more advanced.

Electronic devices have been developed to enable provision of images obtained by adjusting images, captured by cameras, according to various methods so as to be suitable to preferences of users. Examples of such a method include a method for applying different adjustment filters to multiple objects included in a captured image, respectively. An electronic device may identify multiple objects, and may provide a user with an image adjusted by applying a suitable adjustment filter to each of the multiple identified objects.

SUMMARY

When an electronic device adjusts an image including multiple objects, there is a need for a method for selecting an adjustment filter suitable for each of the multiple objects.

After an electronic device applies, to each of the multiple objects, an adjustment filter corresponding to a category of each of the multiple objects, there is a need for a method to cancel adjustment filters applied to some objects among the multiple objects.

Certain embodiments provide an electronic device and a method for identifying categories of the multiple objects included in an image and applying, to the multiple objects, adjustment filters corresponding to the categories.

Certain embodiments provide an electronic device and a method for, according to a user input, applying, to multiple objects, adjustment filters corresponding to categories or canceling all or some of the applied adjustment filters according to a user input.

Certain embodiments provide an electronic device and a method for, according to a user input, applying, to some objects among multiple objects, adjustment filters corresponding to categories or canceling all or some of the applied adjustment filters.

In accordance with an aspect of the disclosure, an electronic device may include a display, a camera, and at least one processor operatively coupled to the camera and the display, the at least one processor is configured to display a first preview image acquired through the camera on the display, identify a category for each object included in the first preview image, apply adjustment filters to each object, each adjustment filter selected based on a respective category identified for each object, display a second preview image on the display, in which each object is visually altered by the applied adjustment filters, display on the second preview image a plurality of selectable icons each corresponding to one of the identified categories, and in response to receiving a first input selecting a first selectable icon, remove application of a first adjustment filter from a first object belonging to a first category corresponding to the first selectable icon.

In accordance with another aspect of the disclosure, a method for controlling an electronic device may include displaying a first preview image acquired through a camera on a display, identifying, by at least one processor of the electronic device, categories for each object included in the first preview image, applying adjustment filters to each object, each adjustment filter selected for each object based on the identified categories, displaying a second preview image on the display, in which each object is visually altered by the applied adjustment filters, displaying on the second preview image a plurality of selectable icons each corresponding to each of the identified categories, and in response to detecting a first input selecting a first selectable icon, removing application of a first adjustment filter from a first object belonging to a category corresponding to the first selectable icon.

In accordance with still another aspect of the disclosure, an electronic device may include a display, a camera, and at least one processor configured to be operatively connected to the camera and the display, wherein the at least one processor is configured to control the display to display an image acquired through the camera as a first preview image, receive a first input selecting a first object from among a plurality of objects included in the first preview image, in response to receiving the first input, identify a category to which the selected first object belongs, control the display to display, on the first preview image, a first selectable icon corresponding to the identified category, receive a second input selecting the first selectable icon, in response to receiving the second input, determine at least one object from among the plurality of objects associated with the identified category including at least the first object, apply, to the determined at least one object, an adjustment filter from among a plurality of adjustment filters corresponding to the identified category, and control the display to display a second preview image including the at least one object visually altered by application of the adjustment filter. According to certain embodiments, in an image including multiple objects, categories of the multiple objects can be identified and an adjustment filter corresponding to a category can be applied to each of the multiple objects classified according to the categories According to certain embodiments, an electronic device can display a graphic object corresponding to a category and can apply adjustment filters corresponding to categories to multiple objects classified according to their categories, according to a user input made on the displayed graphic object or the electronic device can cancel all or some of the applied adjustment filters according to a user input.

According to certain embodiments, an electronic device can apply an adjustment filter to some objects among multiple objects included in an identical category or can cancel the application of the adjustment filter thereto, according to a user input made on the some objects among the multiple objects included in the identical category.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
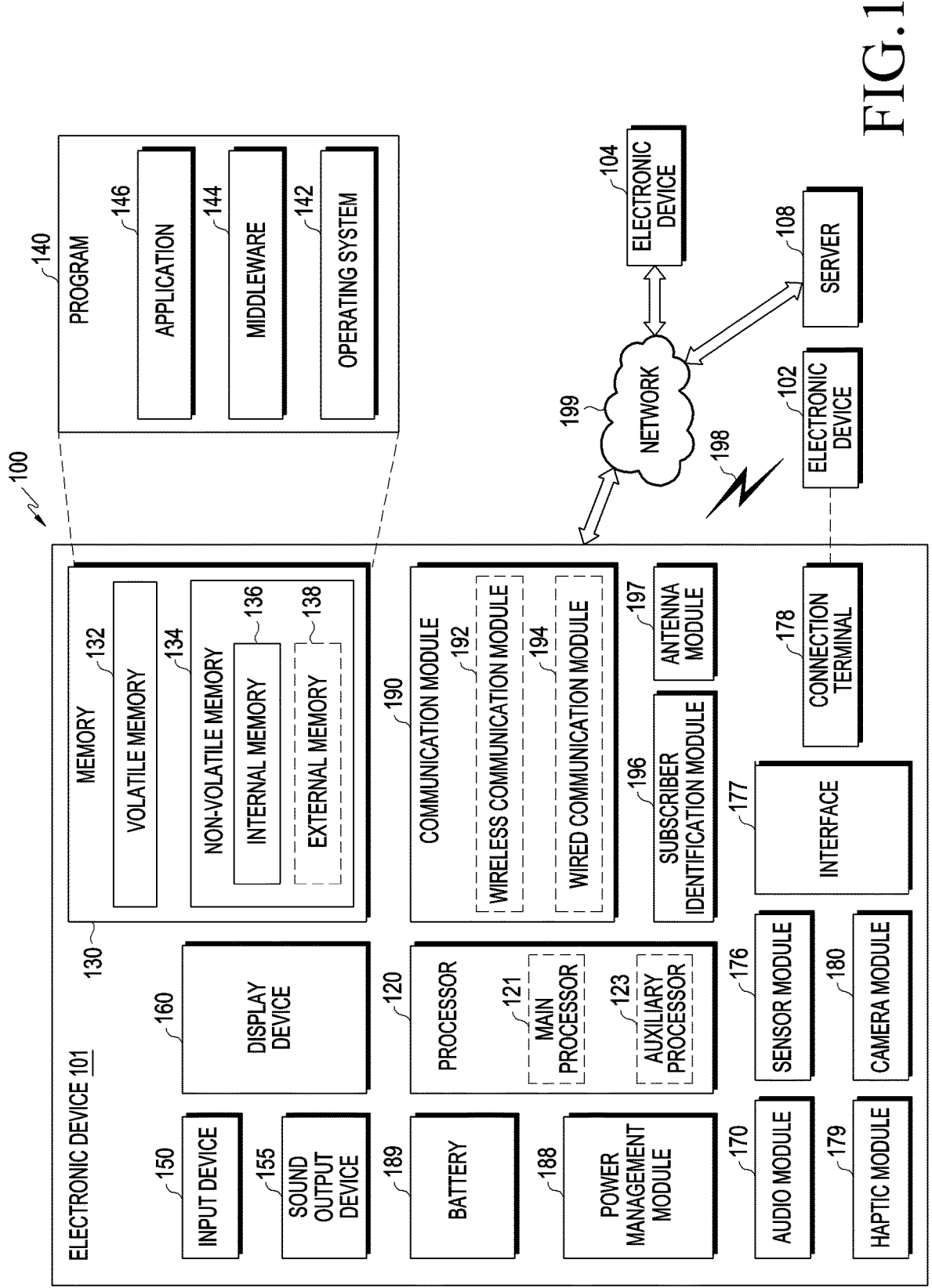
FIG. 1 is block diagram illustrating a configuration of an electronic device within a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a recording, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
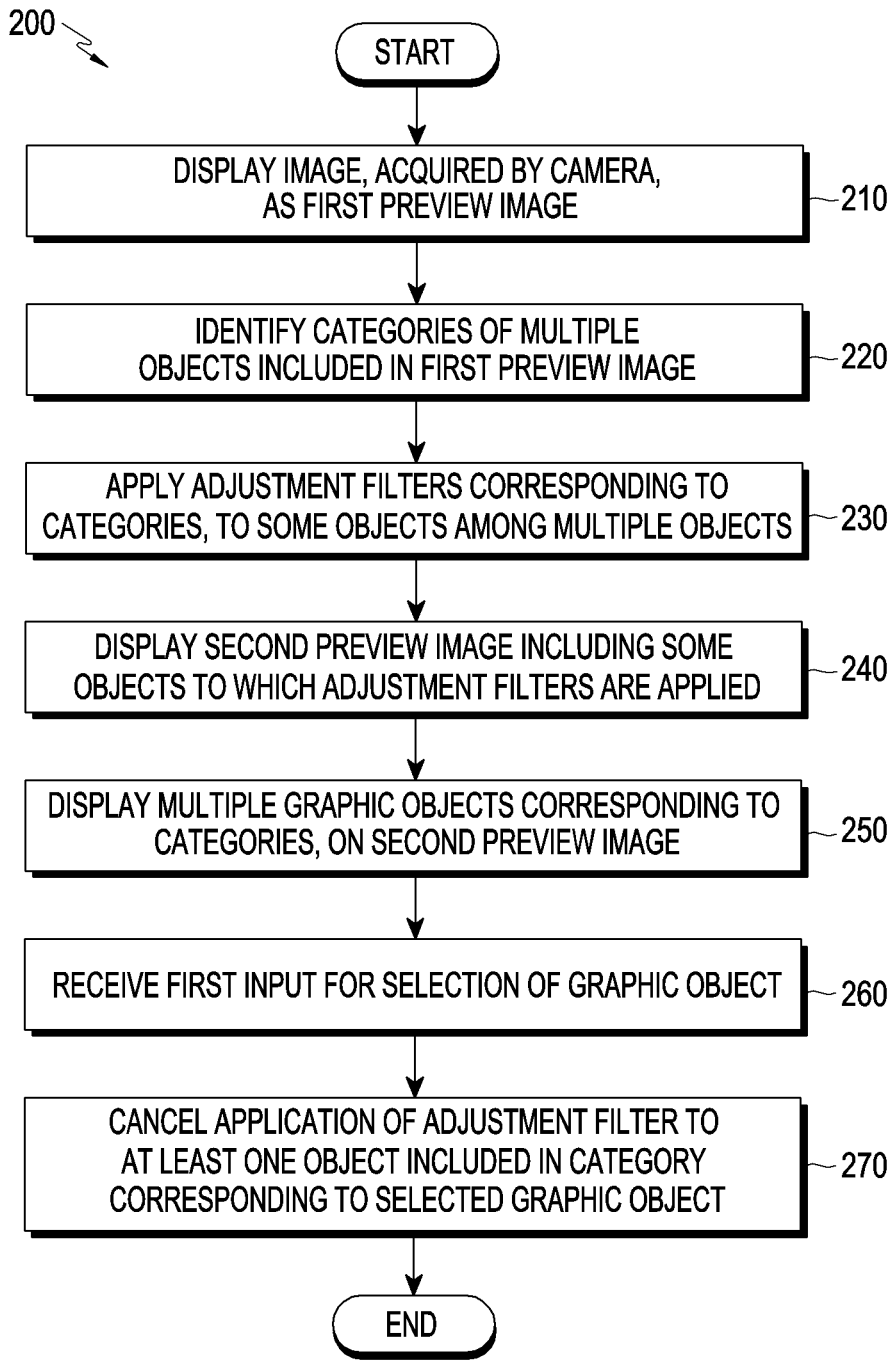
FIG. 2 is a flowchart illustrating an example of an image adjustment operation of an electronic device according to certain embodiments.

FIG. 2 is a flowchart 200 illustrating an example of an image adjustment method of an electronic device according to certain embodiments.

Figure 3A:
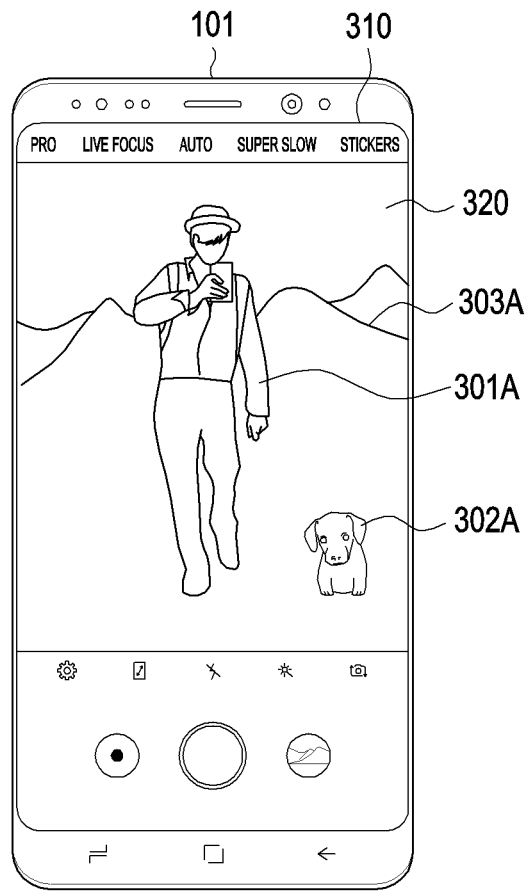
FIG. 3A is a view for explaining an example of an image adjustment operation of an electronic device according to certain embodiments.

In operation 210, the electronic device (e.g., the processor 120 of FIG. 1) according to certain embodiments may display an image, acquired by a camera, as a first preview image. For example, the electronic device (e.g., the processor 120 of FIG. 1) according to certain embodiments may receive an image, captured by the camera (e.g., the camera module 180 of FIG. 1), and may display the same as a first preview image on a display (e.g., the display device 160 of FIG. 1). The received image may include at least one object. For example, the at least one object may include a first object 301A (e.g., a person), a second object 302A (e.g., an animal), or a third object 303A (e.g., a mountain), as illustrated in FIG. 3A. In the disclosure, a captured image according to certain embodiments will be described on the assumption that the captured image includes multiple objects. The preview image is an image which is received from the camera (e.g., the camera module 180 of FIG. 1) of the electronic device (e.g., the electronic device 101 of FIG. 1) and is displayed in real time on the display (e.g., the display 310 of FIG. 3A), and may be an image having a resolution identical to or different from that of a captured image which has been captured according to a user input and is stored in the electronic device 101 (e.g., the memory 130 of FIG. 1). For example, a preview image may have a High-Definition (HD) resolution, and a captured image may have an Ultra-High Definition (UHD) resolution.

In operation 220, the electronic device (e.g., the processor 120 of FIG. 1) according to certain embodiments may identify categories of multiple objects included in the first preview image. The electronic device (e.g., the processor 120 of FIG. 1) according to certain embodiments may identify feature information of each of the multiple objects included in the first preview image. The feature information of an object according to certain embodiments may include information on a feature point of the object for recognition of the object through a comparison of an image with at least one reference image stored in the memory (e.g., the memory 130 of FIG. 1) or an external electronic device (e.g., the electronic device 102 of FIG. 1). The electronic device (e.g., the processor 120 of FIG. 1) according to certain embodiments may identify a category of each of the multiple objects on the basis of the feature information of each of the multiple objects. For example, the electronic device 101 may compare the multiple objects with at least one reference image stored in the memory (e.g., the memory 130 of FIG. 1) or an external electronic device (e.g., the electronic device 102 of FIG. 1). The electronic device 101 according to certain embodiments may identify a category of each of the multiple objects on the basis of a comparison result. The electronic device 101 according to certain embodiments may identify that: a first object (e.g., the first object 301A of FIG. 3A) is an object included in a first category (e.g., a person); a second object (e.g., the second object 302A of FIG. 3A) is an object included in a second category (e.g., an animal); and a third object (e.g., the third object 303A of FIG. 3A) is an object included in a third category (e.g., a mountain). In FIG. 3A, the number of objects included in an identical category among the multiple objects included in the image is illustrated as being equal to one, but the disclosure is not limited thereto. According to certain embodiments, multiple objects may be included in an identical category.

In the above-described operation 220, an object recognition operation of identifying a category of an object may be performed using various methods as well as the above-described methods.

Figure 3B:
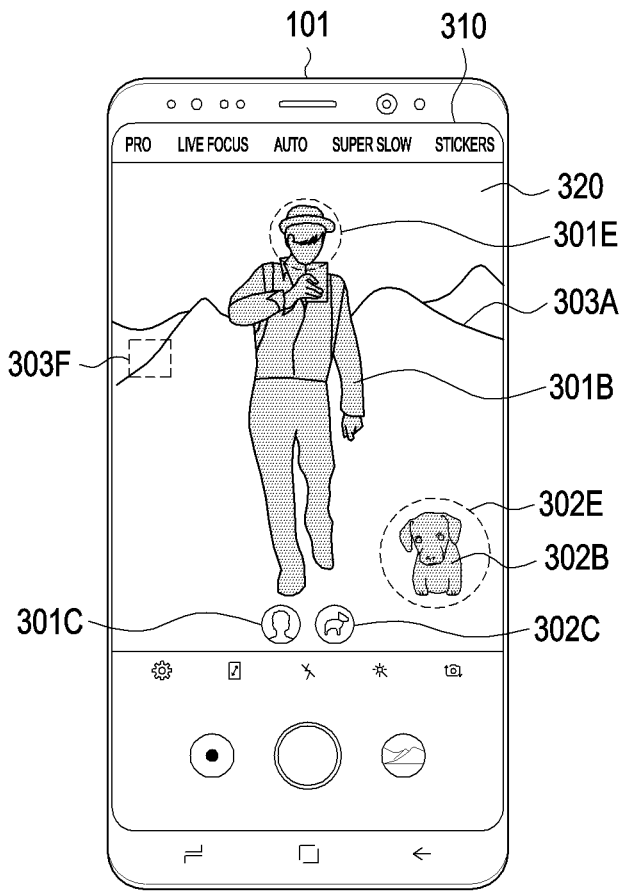
FIG. 3B is a view for explaining an example of an image adjustment operation of an electronic device according to certain embodiments.

In operation 230, the electronic device (e.g., the processor 120 of FIG. 1) according to certain embodiments may apply adjustment filters corresponding to categories to at least some objects among the multiple objects. Referring to FIGS. 3A and 3B, according to certain embodiments, when a predesignated condition is satisfied or a user makes a selection, the electronic device 101 may determine an object (e.g., the first object 301A or the second object 302A of FIG. 3A) where an adjustment filter is to be applied among the multiple objects (e.g., the first object 301A, the second object 302A, and the third object 303A of FIG. 3A). The electronic device (e.g., the processor 120 of FIG. 1) according to certain embodiments may apply an adjustment filter (e.g., a person adjustment filter) corresponding to the first category (e.g. a person) to an object (e.g., the first object 301A of FIG. 3A) included in the first category and may apply an adjustment filter (e.g., an animal adjustment filter) corresponding to the second category (e.g., an animal) to an object (e.g., the second object 302A of FIG. 3A) included in the second category. The memory (e.g., the memory 130 of FIG. 1) of the electronic device (e.g., the electronic device 101 of FIG. 1) according to certain embodiments may be configured to store multiple adjustment filters. For example, the multiple adjustment filters may include a color filter, an Ultraviolet (UV) adjustment filter, a color temperature conversion filter, a sharpness enhancement filter, a blur filter, or the like. Multiple adjustment filters according to certain embodiments may be used to change at least one of a color of an image including an object, an edge thereof, a polygon thereof, a saturation thereof, a brightness thereof, a color temperature thereof, a blur thereof, a sharpness thereof, or a contrast thereof. The electronic device 101 according to certain embodiments may apply an adjustment filter corresponding to the first category to a region in which an object included in the first category is located with a strength different from a strength with which the adjustment filter corresponding to the first category is applied to another region. For example, an object included in the first category may be adjusted to be more brightly displayed than an object located in another region. For example, a change of the strength, with which an adjustment filter is applied, may imply that an adjustment strength of at least one adjustment target parameter included in the adjustment filter is changed.

In operation 240, the electronic device (e.g., the processor 120 of FIG. 1) according to certain embodiments may display a second preview image including some objects to which the adjustment filters are applied. The electronic device 101 according to certain embodiments may display the second preview image on the display (e.g., the display 310 of FIG. 3A). A second preview image according to certain embodiments may include some objects (e.g., the first object 301A or the second object 302A of FIG. 3A), to which the adjustment filters have been applied and an object (e.g., the third object 303A of FIG. 3A) to which an adjustment filter has not been applied among the multiple objects included in the first preview image.

In operation 250, the electronic device (e.g., the processor 120 of FIG. 1) according to certain embodiments may display multiple graphic objects corresponding to categories on the second preview image. The electronic device 101 according to certain embodiments may display multiple graphic objects (e.g., a first graphic object 301C and a second graphic object 302C of FIG. 3B and a third graphic object 303D of FIG. 8A) corresponding to the categories of the multiple objects identified in operation 220 on an lower end part (e.g., a part near a lower edge of the display with reference to a case where a user looks, straight in the eye, the display device 160 of the electronic device 101) of the display (e.g., the display 310 of FIG. 3). A first graphic object and a second graphic object (e.g., the first graphic object 301C and the second graphic object 302C of FIG. 3B) according to certain embodiments may be graphic objects having shapes corresponding to the first category and the second category (e.g., a person category and an animal category). A position or a shape where the first graphic object (e.g., the first graphic object 301C of FIG. 3B) according to certain embodiments is displayed is not limited thereto. For example, first, second, and third graphic objects according to certain embodiments may be displayed at an upper end part of the display 310. The first, second, and third graphic objects according to certain embodiments may include various shapes, such as a triangular shape, a star shape, or a shape designated by a user. A third graphic object (e.g., a third graphic object 303C of FIG. 8B) according to certain embodiments may be a graphic object having a shape corresponding to the third category (e.g. a mountain category). The third graphic object (e.g., the third graphic object 303C of FIG. 8B) according to certain embodiments may be displayed in a background color different from that of the first graphic object. For example, according to certain embodiments, the first graphic object may be displayed on a white background, and the third graphic object may be displayed on a shaded (e.g., gray) background.

In operation 260, the electronic device (e.g., the processor 120 of FIG. 1) according to certain embodiments may receive a first input for selection of a graphic object. For example, the electronic device 101 according to certain embodiments may receive, through the display (e.g., the display 310 of FIG. 3A), a first input for selection of a first graphic object (e.g., the first graphic object 301C of FIG. 3B) from among multiple graphic objects (e.g., the first graphic object 301C and the second graphic object 302C of FIG. 3B, and the third graphic object 303D of FIG. 8A) displayed on the second preview image.

In operation 270, the electronic device (e.g., the processor 120 of FIG. 1) according to certain embodiments may cancel the application of the adjustment filter to at least one object included in a category corresponding to the selected graphic object. For example, the electronic device 101 according to certain embodiments may cancel the application of the adjustment filter to at least one object (e.g., the first object 301A of FIG. 3A) included in a category (e.g., a person category) corresponding to a graphic object (e.g., the first graphic object 301C of FIG. 3B) selected from among the objects (e.g., the first object 301A and the second object 302A of FIG. 3A) where the adjustment filters have been applied in operation 230.

FIG. 3A is a view for explaining an example of an image adjustment method of the electronic device 101 according to certain embodiments. FIG. 3B is a view for explaining an example of an image adjustment method of the electronic device 101 according to certain embodiments.

Referring to FIG. 3A, the electronic device (e.g., the processor 120 of FIG. 1) according to certain embodiments may display an image, received from the camera (e.g., the camera module 180 of FIG. 1), as a preview image 320 on the display 310 (e.g., the display device 160 of FIG. 1). The preview image 320 may include multiple objects (e.g., the first object 301A, the second object 302A, and the third object 303A). For example, the first object 301A may be a person, the second object 302A may be an animal, and the third object 303A may be a mountain, and the first object 301A, the second object 302A, and the third object 303A may be images (in other words, original images) to which adjustment filters are not applied.

Referring to FIG. 3B, the electronic device (e.g., the processor 120 of FIG. 1) according to certain embodiments may identify a category of each of the multiple objects. For example, the electronic device 101 according to certain embodiments may identify that: the category of the first object 301A is a person; the category of the second object 302A is an animal; and the category of the third object 303A is a mountain.

The electronic device (e.g., the processor 120 of FIG. 1) according to certain embodiments may apply some adjustment filters (e.g., a person adjustment filter or an animal adjustment filter) among multiple adjustment filters (e.g., a person adjustment filter, an animal adjustment filter, and a mountain adjustment filter) corresponding to the identified categories, to the first object 301A and the second object 302A on the basis of the identified categories, respectively. An adjustment effect corresponding to an adjustment filter of each category according to certain embodiments may be predetermined. For example, an adjustment filter corresponding to the first object (e.g., a person) may include an adjustment filter configured to perform an operation of increasing luminance of the first object and reducing brightness thereof. For example, an adjustment filter corresponding to the second object (e.g., an animal) may include an adjustment filter configured to perform an operation of increasing a contrast of the first object and increasing a brightness thereof. According to certain embodiments, different adjustment filters may be applied to multiple objects.

The electronic device (e.g., the processor 120 of FIG. 1) according to certain embodiments may display, on a preview image 320, multiple graphic objects (e.g., the first graphic object 301C, the second graphic object 302C, and an unillustrated third graphic object) corresponding to the identified categories (e.g., a person category, an animal category, and a mountain category). For example, the first graphic object 301C may be displayed in a human shape, the second graphic object 302C may be displayed in an animal shape, and the third graphic object (not illustrated) may be displayed in a mountain shape. According to certain embodiments, the multiple graphic objects (e.g., the first graphic object 301C, the second graphic object 302C, and the third graphic object (not illustrated)) may be displayed at the bottom of the preview image 320 and a position, at which the multiple graphic objects are displayed, is not limited thereto. For example, in this example, the electronic device (e.g., the processor 120 of FIG. 1) according to certain embodiments may display the third graphic object (not illustrated), which is not a category for image adjustment but corresponds to a category (e.g. a mountain), as an object having a shaded mountain shape at the bottom of the preview image 320.

The electronic device (e.g., the processor 120 of FIG. 1) according to certain embodiments may display a first indicator 301E and a second indicator 302E, for the objects (e.g., the first object 301A and the second object 302A), to which the adjustment filters are applied, respectively. The first indicator 301E and the second indicator 302E may be configured a visual indicator for notifying a user that the objects, where the indicators is displayed, are objects to which adjustment filters are applied. For example, each of the first and second indicators 301E and 302E may have a circular shape represented by a dotted line, as illustrated in FIG. 3B. The electronic device (e.g., the processor 120 of FIG. 1) according to certain embodiments may display a third indicator 303F, for the third object 303A to which an adjustment filter is not applied. The third indicator may be configured as a visual indicator for notifying a user that the object, where the indicators is displayed, is an object to which an adjustment filter is not applied. For example, the third indicator 303F may have a quadrangular shape represented by a dotted line, as illustrated in FIG. 3B.

Figure 4:
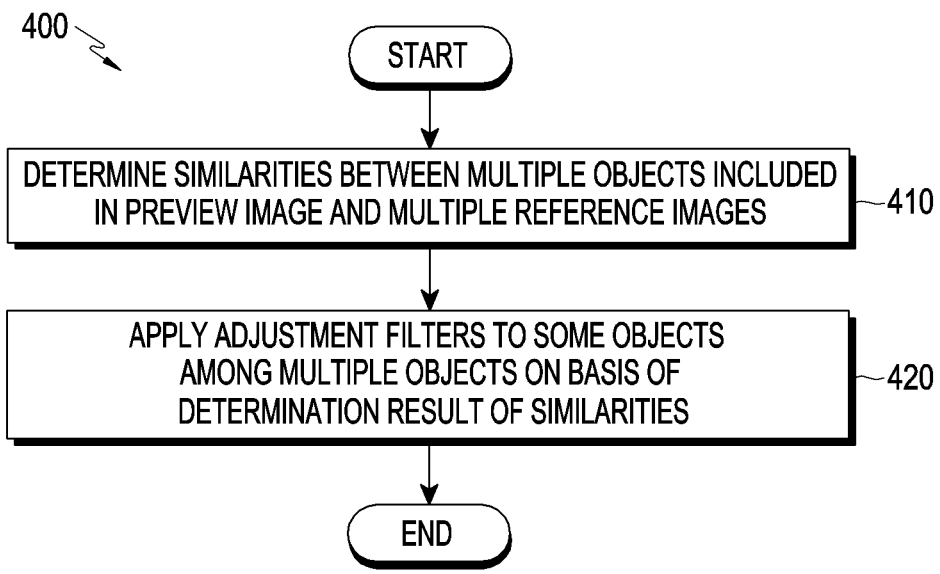
FIG. 4 is a flowchart illustrating an example of an operation of an electronic device for adjusting some objects among multiple objects through determination of a similarity according to certain embodiments.

FIG. 4 is a flowchart 400 illustrating an example of a method of an electronic device (e.g., the electronic device 101 of FIG. 1) for adjusting some objects among multiple objects through determination of a similarity according to certain embodiments.

In operation 410, the electronic device (e.g., the processor 120 of FIG. 1) according to certain embodiments may determine similarities between multiple objects included in a preview image and multiple reference images. For example, the electronic device (e.g., the processor 120 of FIG. 1) according to certain embodiments may compare reference images (e.g., a person reference image and a mountain reference image) corresponding to categories (e.g., a person category and a mountain category) with each other on the basis of the categories of multiple objects (e.g., a person object and a mountain object) included in a preview image. For example, the electronic device 101 according to certain embodiments may compare information on a feature point of a person object with a feature point of an object included in a person reference image on the basis of information on feature points of objects included in a preview image, and may compare information on a feature point of a mountain object with a feature point of an object included in a mountain reference image, so as to determine a similarity degree between images as a numerical value. Various technologies may be used for an operation or a function of determining a similarity degree.

In operation 420, the electronic device (e.g., the processor 120 of FIG. 1) according to certain embodiments may apply adjustment filters to some objects among the multiple objects on the basis of a determination result of the similarities. For example, when a similarity between an object (e.g., the first object 301A of FIG. 3A) corresponding to the person category and a person reference image is higher than a similarity between an object (e.g., the third object 303A of FIG. 3A) corresponding to the mountain category and a mountain reference image (e.g., a similarity expressed as a numerical value has a value greater than that of another), the electronic device (e.g., the processor 120 of FIG. 1) according to certain embodiments may apply an adjustment filter (e.g., a person adjustment filter) to the object corresponding to the person category. The electronic device 101 according to an embodiment may apply an adjustment filter to the object corresponding to the mountain category having a relatively low similarity. For example, the adjustment filter may be configured to reduce a brightness of the object corresponding to the mountain category having a relatively low similarity so that the object corresponding to the person category having a relatively high similarity can be visually emphasized in an image, though this configuration is only an example.

Figure 5:
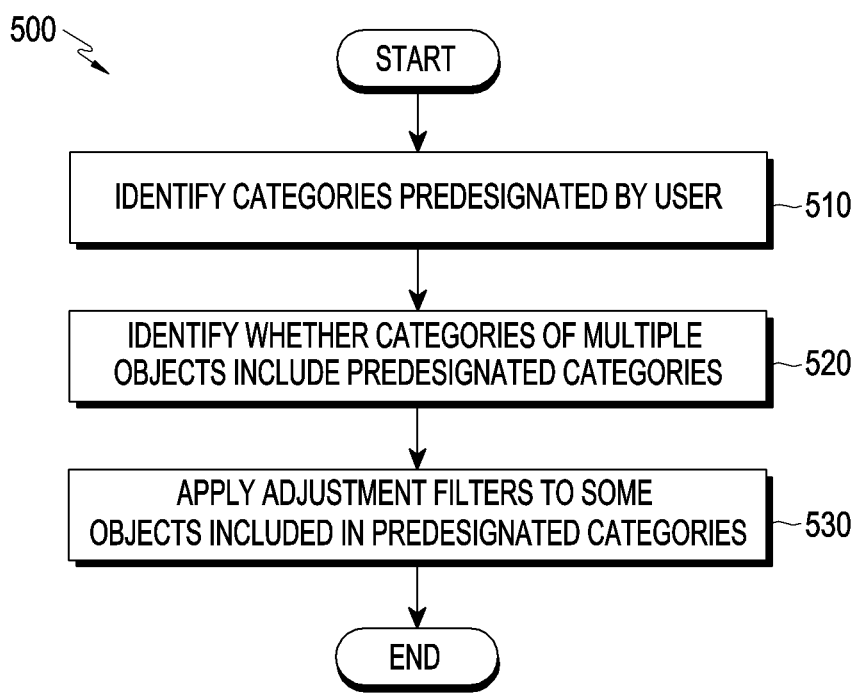
FIG. 5 is a flowchart illustrating an example of an operation of an electronic device for adjusting objects included in a predesignated category according to certain embodiments.

FIG. 5 is a flowchart 500 illustrating an example of a method of an electronic device (e.g., the electronic device 101 of FIG. 1) for adjusting objects included in a predesignated category according to certain embodiments.

In operation 510, the electronic device (e.g., the processor 120 of FIG. 1) according to certain embodiments may identify a category predesignated by a user. The electronic device (e.g., the processor 120 of FIG. 1) according to certain embodiments may designate a category of an object which is to be adjusted (i.e., to which an adjustment filter is to be applied) in an image to be received from a camera (e.g., the camera module 180 of FIG. 1). For example, when a user turns on the configuration of a first category (e.g., a person category) and a second category (e.g., an animal category) and turns off the configuration of a third category (e.g., a mountain category) among multiple categories (e.g., the first category, the second category, and a third category), the first category and the second category may be the predesignated categories.

In operation 520, the electronic device (e.g., the processor 120 of FIG. 1) according to certain embodiments may identify whether categories of multiple objects include the designated categories. For example, the predesignated categories may include the first category (e.g., a person category) and the second category (e.g., an animal category) in operation 520.

In operation 530, the electronic device (e.g., the processor 120 of FIG. 1) according to certain embodiments may apply adjustment filters to some objects included in the predesignated categories. When it is identified that the categories (e.g., a person category and a mountain category) of the multiple objects include the designated categories (e.g., a person category and an animal category), the electronic device (e.g., the processor 120 of FIG. 1) according to certain embodiments may apply an adjustment filter to an object included in the first category (e.g., a person category). The adjustment filter may be an adjustment filter corresponding to the first category.

Figure 6:
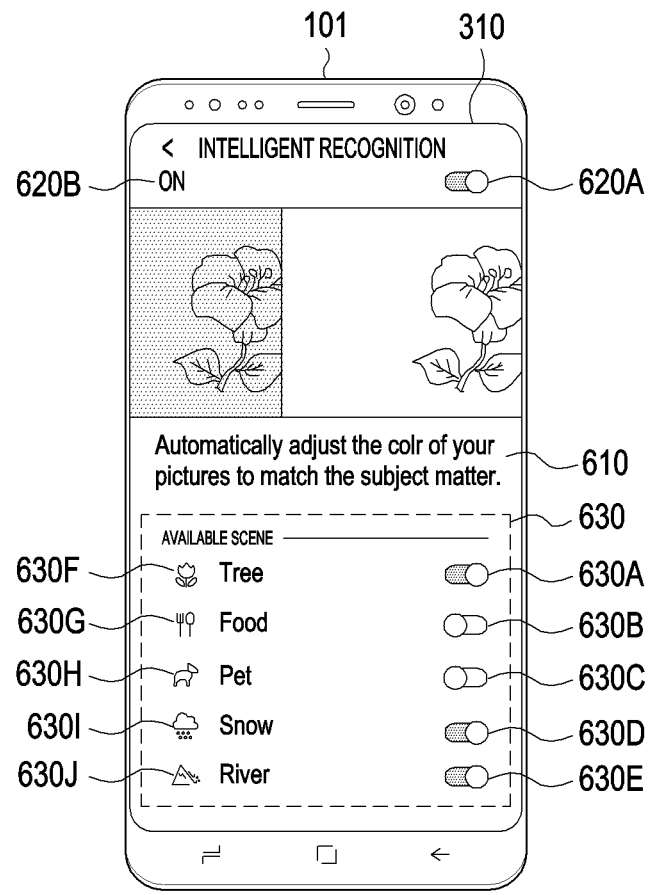
FIG. 6 is a view for explaining an example of a user interface for the predesignated category described with reference to FIG. 5 according to certain embodiments.

FIG. 6 is a view for explaining an example of a user interface for the predesignated category described with reference to FIG. 5 according to certain embodiments.

Referring to FIG. 6, the electronic device (e.g., the processor 120 of FIG. 1) according to certain embodiments may display an intelligence recognition configuration window 610 on the display 310 (e.g., the display device 160 of FIG. 1). The displayed intelligence recognition configuration window 610 may include a configuration toggle 620A, a configuration graphic object 620B, and a configuration list 630. The configuration list 630 may include multiple graphic objects 630F, 630G, 630H, 630I, and 630J, and multiple on/off toggles 630A, 630B, 630C, 630D, and 630E.

The electronic device (e.g., the processor 120 of FIG. 1) according to certain embodiments may receive, from a user, an input for selection of the configuration toggle 620A or at least one of the multiple on/off toggles 630A, 630B, 630C, 630D, and 630E. For example, when an input for selection of the configuration toggle 620A is received from the user, the electronic device (e.g., the processor 120 of FIG. 1) according to certain embodiments may have a changed toggle state (e.g., an off-state or an on-state). When the toggle state is changed to an off-state, the electronic device 101 according to certain embodiments may not perform, for example, operations 220 to 270 of FIG. 2. In this example, the electronic device 101 according to certain embodiments may not receive a user input for selection of at least one of the first to fifth on/off toggles 630A, 630B, 630C, 630D, and 630E. When the toggle state is changed to an on-state, the electronic device 101 according to certain embodiments may perform, for example, operations 220 to 270 of FIG. 2.

When an input for selection of each of the first on/off toggle 630A, the fourth on/off toggle 630D, and the fifth on/off toggle 630E is received from the user, the electronic device 101 according to certain embodiments may have each changed toggle state (e.g., from an off-state to an on-state). According to certain embodiments, each of the first on/off toggle 630A, the fourth on/off toggle 630D, and the fifth on/off toggle 630E may be displayed in a state where an icon is moved to the right, as illustrated in FIG. 6.

When an input for selection of each of the first on/off toggle 630A, the fourth on/off toggle 630D, and the fifth on/off toggle 630E is received from the user, the electronic device (e.g., the processor 120 of FIG. 1) according to certain embodiments may configure categories (e.g., a tree, snow, and a river) corresponding to the first on/off toggle 630A, the fourth on/off toggle 630D, and the fifth on/off toggle 630E, respectively, as predesignated categories described above with reference to FIG. 5. In this configuration, for example, the electronic device (e.g., the processor 120 of FIG. 1) according to certain embodiments may perform at least one operation among operations 510, 520, and 530 of FIG. 5, with reference to the predesignated categories (e.g., a tree, snow, and a river).

When an input for selection of at least one of the multiple on/off toggles 630A, 630B, 630C, 630D, and 630E is received from the user, the electronic device (e.g., the processor 120 of FIG. 1) according to an embodiment may change display states of multiple graphic objects 620B, 630F, 630G, 630H, 630I, and 630J included in the intelligence recognition configuration window 610. For example, when an input for selection of each of the first on/off toggle 630A, the fourth on/off toggle 630D, and the fifth on/off toggle 630E is received from the user, the electronic device (e.g., the processor 120 of FIG. 1) according to an embodiment may change (e.g., may display in sky blue) display states of the graphic objects 630F, 630I, and 630J corresponding to the on/off toggles 630A, 630D, and 630E selected from the multiple graphic objects 630F, 630G, 630H, 630I, and 630J. In this example, the graphic objects 630G and 630H corresponding to the on/off toggles 630B and 630C, which are not selected by the user, may be displayed, for example, in gray.

The above-described configuration list 630 may include on/off toggles (not illustrated) or graphic objects (not illustrated) corresponding to various categories (e.g., an animal, a beach, a bird, sky, a street scene, a flower, greenery, an indoor scene, a mountain, a night scene, a portrait, sunrise/ sunset, a character, a waterfall, a waterside, and scenery) as well as categories (e.g., a tree, food, a pet, snow, and a river) corresponding to the on/off toggles 630A, 630B, 630C, 630D, and 630E, or the graphic objects 630F, 630G, 630H, 630I, and 630J. This configuration is only an example.

Figure 7:
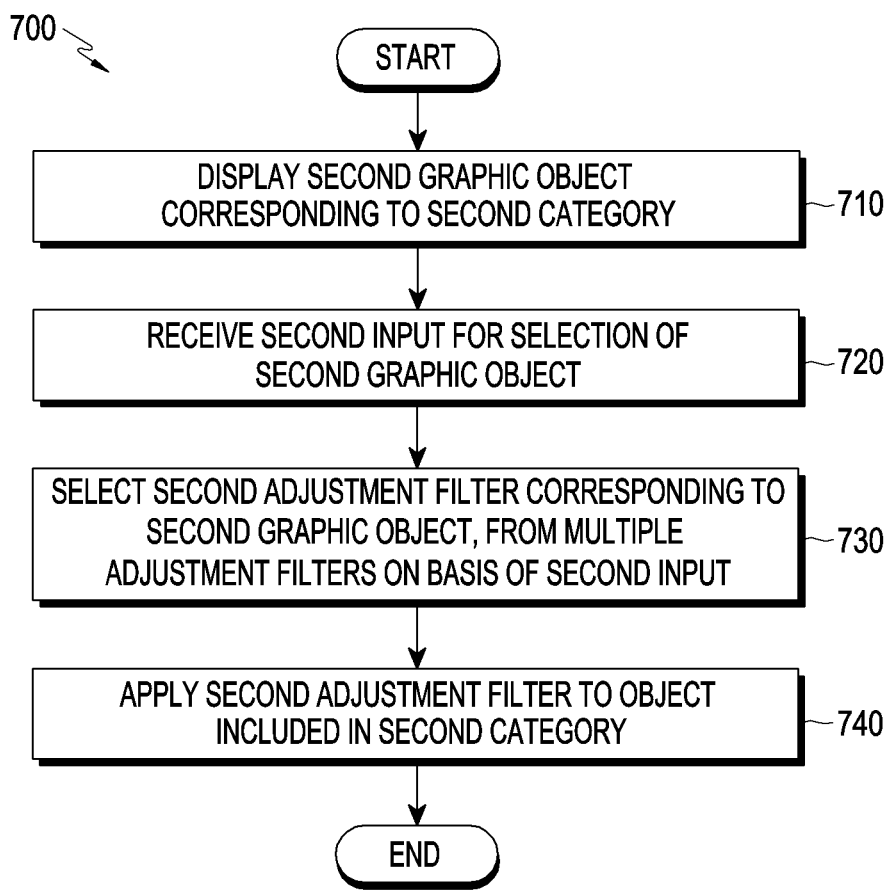
FIG. 7 is a flowchart illustrating an example of an operation of an electronic device according to selection of a graphic object according to certain embodiments.

FIG. 7 is a flowchart 700 illustrating an example of an operating method of an electronic device according to selection of a graphic object according to certain embodiments.

In operation 710, the electronic device (e.g., the processor 120 of FIG. 1) according to certain embodiments may display a second graphic object corresponding to a second category.

The electronic device (e.g., the processor 120 of FIG. 1) according to certain embodiments may display the second graphic object corresponding to the second category on a display (e.g., the display 310 of FIG. 3A). The electronic device 101 according to certain embodiments may display the second graphic object as an object having a shaded shape. The second graphic object may be displayed as a shaded image (e.g., the third graphic object 303D of FIG. 8A) of an object (e.g., a mountain-shaped object) having a shape corresponding to the second category at the bottom of a preview image (e.g., the image 320 of FIG. 8A).

In operation 720, the electronic device (e.g., the processor 120 of FIG. 1) according to certain embodiments may receive a second input for selection of the second graphic object. The electronic device (e.g., the processor 120 of FIG. 1) according to certain embodiments may receive, from a user, the second input for selection of the second graphic object corresponding to the second category displayed on the display (e.g., the display 310 of FIG. 3A).

In operation 730, the electronic device (e.g., the processor 120 of FIG. 1) according to certain embodiments may select a second adjustment filter corresponding to the second graphic object, from multiple adjustment filters on the basis of the second input. The electronic device (e.g., the processor 120 of FIG. 1) according to certain embodiments may select a second adjustment filter corresponding to the second graphic object displayed on a preview image (e.g., the preview image 320 of FIG. 8A or FIG. 8B) from multiple adjustment filters stored in a memory (e.g., the memory 130 of FIG. 1). For example, referring to FIGS. 8A and 8B, the electronic device 101 according to certain embodiments may select a second adjustment filter (e.g., a mountain adjustment filter) corresponding to the second graphic object (e.g., the third graphic object 303D of FIG. 8A), that is, corresponding to a mountain category, on the basis of the second input for selection of the second graphic object (e.g., the third graphic object 303D of FIG. 8A).

In operation 740, the electronic device (e.g., the processor 120 of FIG. 1) according to certain embodiments may apply the second adjustment filter to an object included in the second category. For example, the electronic device (e.g., the processor 120 of FIG. 1) according to certain embodiments may apply the second adjustment filter (e.g., a mountain adjustment filter) corresponding to the second graphic object, to an object (e.g., the third object 303A of FIG. 8A) included in the second category (e.g., a mountain category). When the second input for selection of the second graphic object is received from the user, the electronic device 101 according to certain embodiments may change the second graphic object, displayed as an object having a shaded shape, to an object having a non-shaded shape, and may display the changed second graphic object on the preview image (e.g., the preview image 320 of FIG. 8B). For example, referring to FIG. 8A and FIG. 8B, when the second graphic object is selected by the user, the second graphic object is changed from the third graphic object 303D having a shaded mountain shape of FIG. 8A to the third graphic object 303C having a mountain shape including a white background of FIG. 8B which may be displayed as the third graphic object 303C.

Figure 8A:
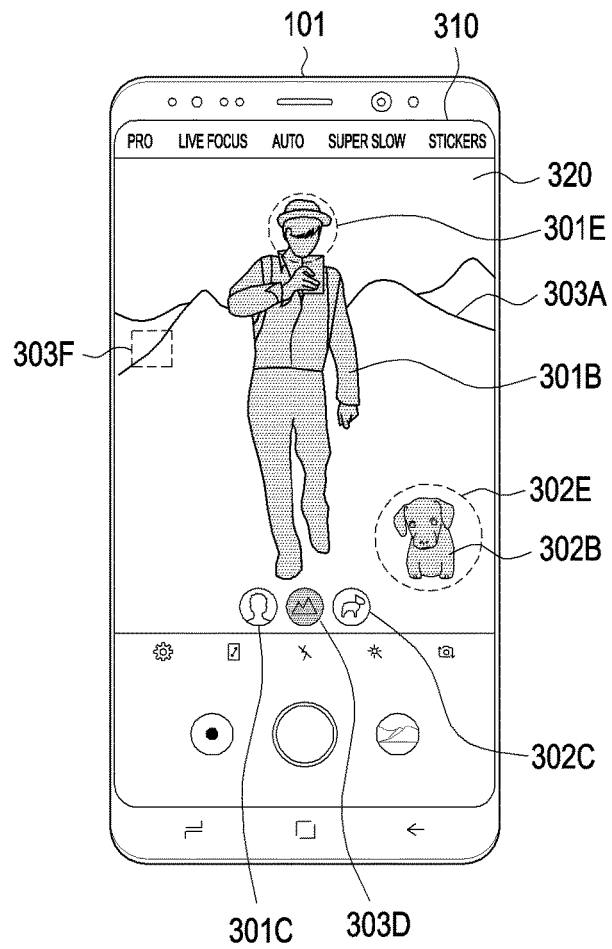
FIG. 8A is a view for explaining an example of an operating method of an electronic device according to selection of a graphic object according to certain embodiments.
Figure 8B:
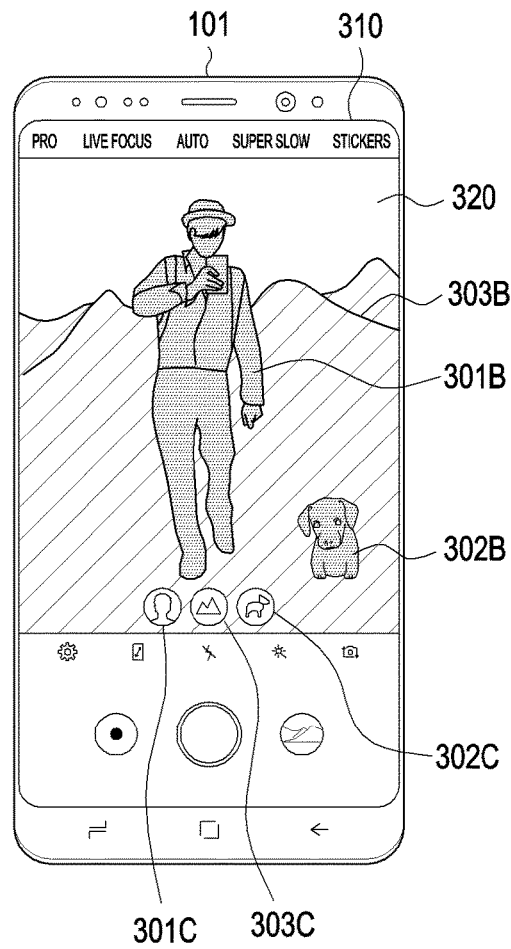
FIG. 8B is a view for explaining an example of an operating method of an electronic device according to selection of a graphic object according to certain embodiments.

FIG. 8A is a view for explaining an example of an operating method of an electronic device according to selection of a graphic object according to certain embodiments. FIG. 8B is a view for explaining an example of an operating method of an electronic device according to selection of a graphic object according to certain embodiments.

The contents, which overlap those described above with reference to FIG. 3 or FIG. 7, will be omitted or be briefly described.

Referring to FIG. 8A, the electronic device (e.g., the processor 120 of FIG. 1) according to certain embodiments may display an image, received from a camera (e.g., the camera module 180 of FIG. 1) as a preview image 320 on the display 310. The preview image 320 may include multiple objects (e.g., the first object 301A, the second object 302A, and the third object 303A).

The electronic device (e.g., the processor 120 of FIG. 1) according to certain embodiments may display a first indicator 301E and a second indicator 302E, for the objects (e.g., the first object 301A and the second object 302A), to which adjustment filters have been applied, respectively, among the multiple objects (e.g., a first object 301B, a second object 302B, and the third object 303A) included in the preview image 320. The electronic device 101 according to an embodiment may display a third indicator 303F for an object (e.g., the third object 303A) corresponding to a category (e.g., a mountain category) to which an adjustment filter is not applied among the objects, of each of which category information has been identified and which are included in the multiple objects. The first and second indicators 301E and 302E and the third indicator 303F may be configured such that whether each of the displayed objects is an object to be adjusted is visually identified, and to this end, may be displayed to have different shapes, forms, colors, or sizes.

The electronic device (e.g., the processor 120 of FIG. 1) according to certain embodiments may display multiple graphic objects (e.g., the first graphic object 301C, the second graphic object 302C, and the third graphic object 303C) corresponding to multiple categories (e.g., a person, an animal, and a mountain). For example, the first graphic object 301C may be displayed in a human shape, the second graphic object 302C may be displayed in an animal shape, and the third graphic object 303D may be displayed in a mountain shape. The electronic device 101 according to certain embodiments may display the third graphic object 303D in a state of being shaded or may not display the third graphic object 303D in order to visually notify a user that a category of the third object 303A corresponds to a category (e.g., a mountain category) to which an adjustment filter is not applied.

The electronic device (e.g., the processor 120 of FIG. 1) according to certain embodiments may receive a user input for selection of the third graphic object 303C. When a user input for selection of the third graphic object 303C is received, the electronic device 101 according to certain embodiments may select an adjustment filter (e.g., a mountain adjustment filter) corresponding to the third graphic object 303C.

Referring to FIG. 8B, when a user input for selection of the third graphic object 303D is received, the electronic device (e.g., the processor 120 of FIG. 1) according to certain embodiments may apply, to an object (e.g., the third object 303A of FIG. 8A) corresponding to a mountain category, an adjustment filter (e.g., a mountain adjustment filter) corresponding to the third graphic object 303C (i.e., a graphic object selected by the user), that is, corresponding to a mountain category, among multiple adjustment filters, so that the application of the adjustment filter to the corresponding object is included and displayed in and on the preview image 320. The electronic device 101 according to certain embodiments may change the third graphic object, displayed as an object having a shaded shape, to an object having a non-shaded shape (e.g., the third graphic object 303C of FIG. 8B) and may display the third graphic object as an object having a non-shaded shape.

Figure 9:
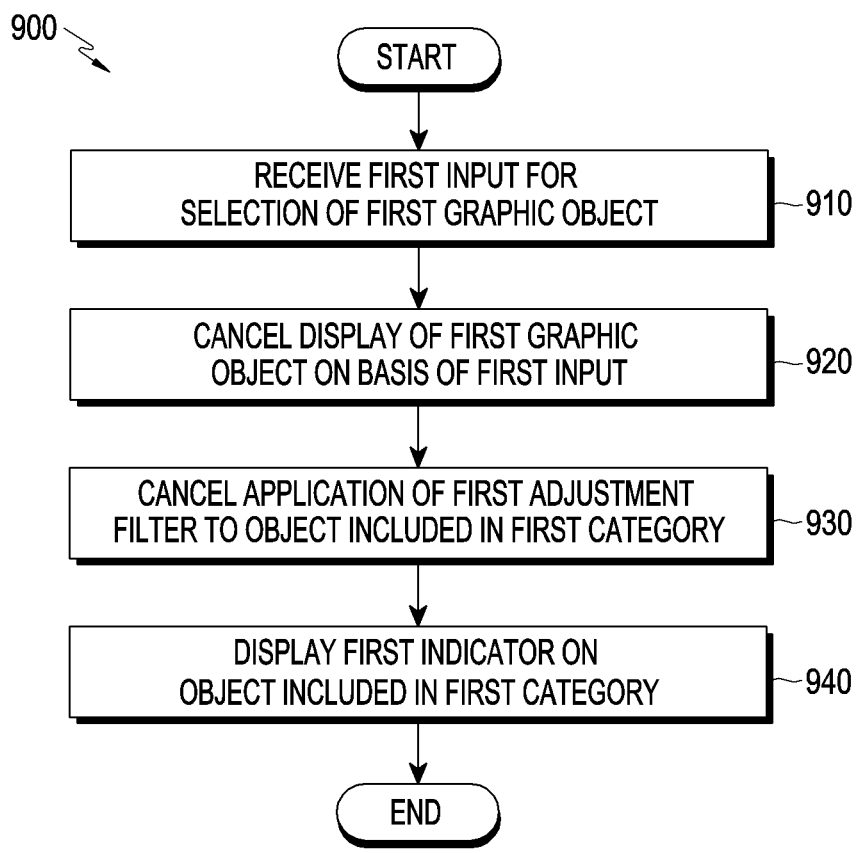
FIG. 9 is a flowchart illustrating an example of an operation of an electronic device for cancelling application of an adjustment filter corresponding to a selected graphic object according to certain embodiments.

FIG. 9 is a flowchart 900 illustrating an example of an operation of an electronic device (e.g., the processor 120 of FIG. 1) for cancelling application of an adjustment filter corresponding to a selected graphic object according to certain embodiments;

In operation 910, the electronic device (e.g., the processor 120 of FIG. 1) according to certain embodiments may receive a first input for selection of a first graphic object. For example, the electronic device (e.g., the processor 120 of FIG. 1) according to certain embodiments may receive, from a user, a first input for selection of a first graphic object (e.g., the first graphic object 301C of FIG. 10A) from multiple graphic objects (e.g., the first graphic object 301C and the second graphic object 302C of FIG. 10A) displayed on a display (e.g., the display 310 of FIG. 10A). For example, the first graphic object (e.g., the first graphic object 301C of FIG. 10A) is displayed in a state of a white background, and thus may indicate that an adjustment filter corresponding to the first graphic object is applied to the first object.

In operation 920, the electronic device (e.g., the processor 120 of FIG. 1) according to certain embodiments may cancel the display of the first graphic object on the basis of the first input.

Figure 10A:
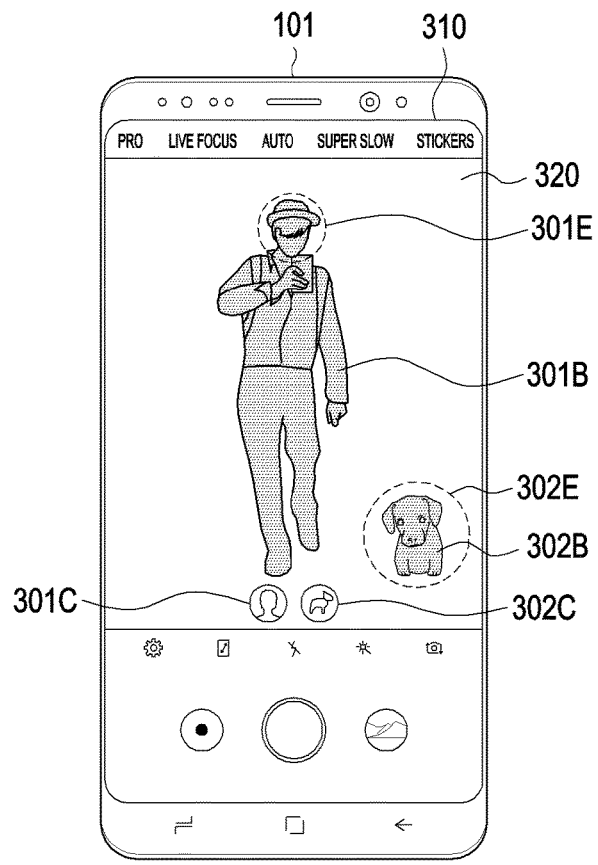
FIG. 10A is a view for explaining an example of an operation of an electronic device for cancelling application of an adjustment filter corresponding to a selected graphic object according to certain embodiments.
Figure 10B:
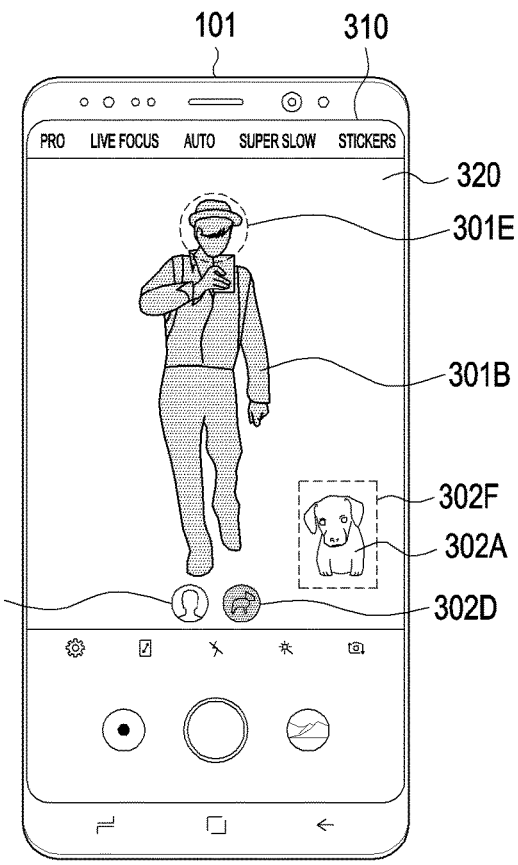
FIG. 10B is a view for explaining an example of an operation of an electronic device for cancelling application of an adjustment filter corresponding to a selected graphic object according to certain embodiments.

When the first input for selection of the first graphic object (e.g., the second graphic object 302C of FIG. 10A) is received from the user, as illustrated in FIGS. 10A and 10B, the electronic device (e.g., the processor 120 of FIG. 1) according to an embodiment may, without cancelling the display of the first graphic object (e.g., the second graphic object 302C of FIG. 10A), display the first graphic object (e.g., the second graphic object 302D of FIG. 10B) obtained by changing (e.g., shading) at least one of a shape, a form, a color, or a size of the first graphic object (e.g., the second graphic object 302C of FIG. 10A).

In operation 930, the electronic device (e.g., the processor 120 of FIG. 1) according to certain embodiments may cancel application of a first adjustment filter to an object included in a first category. For example, the electronic device (e.g., the processor 120 of FIG. 1) according to certain embodiments may identify a first category (e.g., an animal category) corresponding to the first graphic object (e.g. the second graphic object 302C of FIG. 10A), and may cancel application of a first adjustment filter (e.g., an animal adjustment filter) to an object (e.g., the adjusted second object 302B of FIG. 10A) corresponding to the identified first category. For example, an object (e.g., the second object 302B of FIG. 10A) included in the first category may be displayed as a second object (e.g., the second object 302A of FIG. 10B) as illustrated in FIG. 10B since the application of a first adjustment filter (e.g., an animal adjustment filter) thereto is cancelled.

In operation 940, the electronic device (e.g., the processor 120 of FIG. 1) according to certain embodiments may display a first indicator on an object included in the first category. For example, the electronic device 101 according to certain embodiments may display a first indicator (e.g., the second indicator 302F of FIG. 10B) on the display (e.g., the display 310 of FIG. 10). The first indicator may be configured as a visual indicator for notifying the user that the object, where the indicator is displayed, is an object to which an adjustment filter is not applied.

FIG. 10A is a view for explaining an example of an operation of an electronic device (e.g., the processor 120 of FIG. 1) for cancelling application of an adjustment filter corresponding to a selected graphic object according to certain embodiments. FIG. 10B is a view for explaining an example of an operation of an electronic device (e.g., the processor 120 of FIG. 1) for cancelling application of an adjustment filter corresponding to a selected graphic object according to certain embodiments.

Referring to FIG. 10A, the electronic device (e.g., the processor 120 of FIG. 1) according to certain embodiments may display multiple graphic objects (e.g., the first graphic object 301C, the second graphic object 302C, and a preview image 320) on the display 310. The preview image 320 may include a first object 301B and a second object 302B. The first object 301B and the second object 302B may be objects to which adjustment filters (e.g., a person adjustment filter and an animal adjustment filter) corresponding to categories are applied, respectively. A first indicator 301E and a second indicator 302E may be displayed on the first object 301B and the second object 302B, respectively. The first indicator 301E and the second indicator 302E may be configured to notify the user that the first object 301B and the second object 302B, where the indicators are displayed, are objects to which adjustment filters are applied, respectively. The electronic device 101 according to certain embodiments may receive, from the user, an input for selection of the second graphic object 302C.

Referring to FIG. 10B, when the second graphic object 302C is selected as illustrated in FIG. 10A, the electronic device (e.g., the processor 120 of FIG. 1) according to certain embodiments may change a background color of the second graphic object 302C, and thus may display the second graphic object 302D changed from the second graphic object 302C. For example, as illustrated in FIGS. 10A and 10B, the second graphic object 302C may be displayed in a state of a white background, and the changed second graphic object 302D may be shaded and displayed. When the second graphic object 302C is selected, the electronic device 101 according to an embodiment may cancel the display of the second graphic object 302C.

When the second graphic object 302D is selected, the electronic device (e.g., the processor 120 of FIG. 1) according to certain embodiments may identify a second category (e.g., an animal category) corresponding to the second graphic object 302D, and may cancel the application of a second adjustment filter (e.g., an animal adjustment filter) applied to the object (e.g., the second object 302B of FIG. 10A) included in the second category (e.g., an animal category). When the application of the second adjustment filter (e.g., an animal adjustment filter) is cancelled, the adjusted second object 302B of FIG. 10A may be displayed as the second object 302A (in a non-adjusted state) of FIG. 10B.

The electronic device (e.g., the processor 120 of FIG. 1) according to certain embodiments may display a second indicator 302F, for the second object 302A. The second indicator 302F may be configured as a visual indicator for notifying the user that the object, where the indicator is displayed, is an object to which an adjustment filter is not applied.

Figure 11:
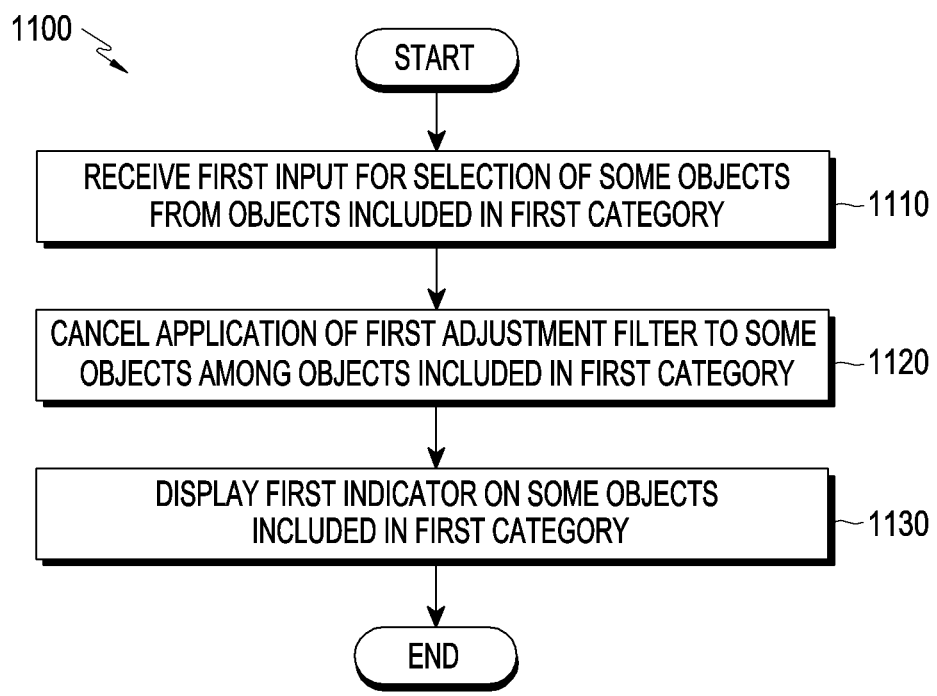
FIG. 11 is a flowchart illustrating an example of an operation of an electronic device for cancelling application of an adjustment filter to some of multiple objects included in an identical category according to certain embodiments.
Figure 12A:
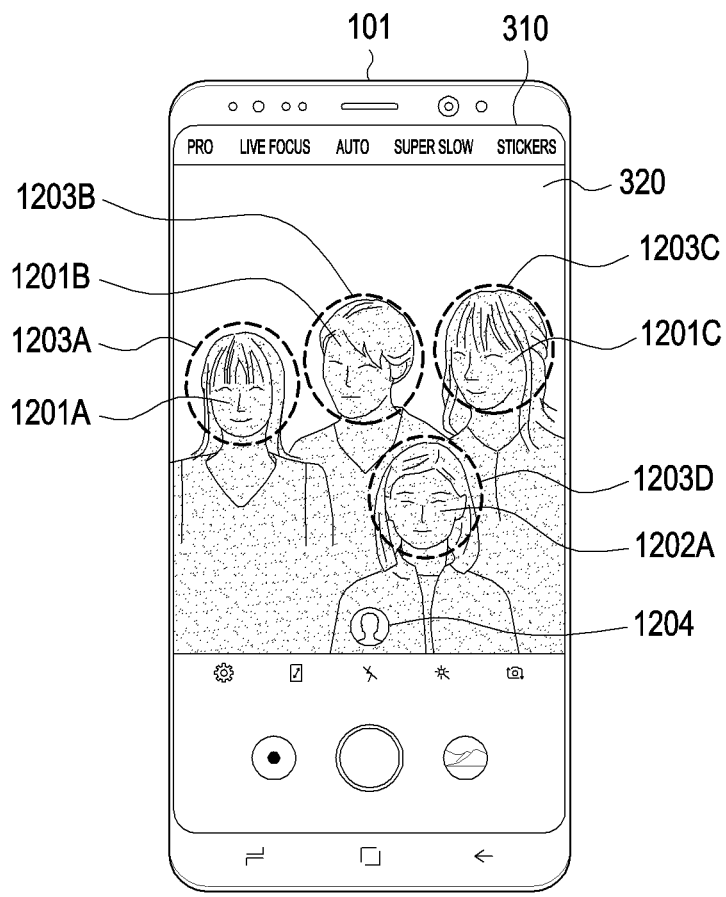
FIG. 12A is a view for explaining an example of an operation of an electronic device for cancelling application of an adjustment filter to some objects among multiple objects included in an identical category according to certain embodiments.

FIG. 11 is a flowchart 1100 illustrating an example of an operation of an electronic device (e.g., the processor 120 of FIG. 1) for cancelling application of an adjustment filter to some of the multiple objects included in an identical category according to certain embodiments;

In operation 1110, the electronic device (e.g., the processor 120 of FIG. 1) according to certain embodiments may receive a first input for selection of some objects from among objects included in a first category. The electronic device (e.g., the processor 120 of FIG. 1) according to certain embodiments may receive, from a user, a first input for selection of at least one object from among multiple objects included in the first category. For example, the multiple objects included in the first category may be multiple (e.g., 4) objects (e.g., as indicated by reference numerals 1201A, 1201B, 1201C, and 1202A of FIG. 12A) included in the same first category (e.g., a person category), as illustrated in FIG. 12A. The multiple objects may be objects to which a first adjustment filter (e.g., a person adjustment filter) is applied. In this example, the electronic device 101 according to certain embodiments may display indicators (e.g., as indicated by reference numerals 1203A, 1203B, 1203C, and 1203D of FIG. 12A) for the multiple objects (e.g., as indicated by reference numerals 1201A, 1201B, 1201C, and 1202A of FIG. 12A), respectively. The indicators (e.g., as indicated by reference numerals 1203A, 1203B, 1203C, and 1203D of FIG. 12A) may be configured to notify a user that the multiple objects (e.g., as indicated by reference numerals 1201A, 1201B, 1201C, and 1202A of FIG. 12A), where the indicators are displayed, are objects to which an adjustment filter is applied. According to certain embodiments, the first input for selection of at least one object may include at least one of: a touch input on at least one of the indicators (e.g., as indicated by reference numerals 1203A, 1203B, 1203C, and 1203D of FIG. 12A); or a touch input on a region in which the multiple objects (e.g., as indicated by reference numerals 1201A, 1201B, 1201C, and 1202A of FIG. 12A) are displayed.

In operation 1120, the electronic device (e.g., the processor 120 of FIG. 1) according to certain embodiments may cancel the application of the first adjustment filter to some objects among the objects included in the first category. The electronic device (e.g., the processor 120 of FIG. 1) according to certain embodiments may cancel the application of the first adjustment filter to at least one object among the multiple objects included in the first category. For example, as illustrated in FIG. 12A, the electronic device (e.g., the processor 120 of FIG. 1) according to certain embodiments may cancel the application of the first adjustment filter to at least one object (e.g., as indicated by reference numeral 1202A) corresponding to the first input, among the multiple objects (e.g., as indicated by reference numerals 1201A, 1201B, 1201C, and 1202A of FIG. 12A) included in the same first category (e.g., a person category).

In operation 1130, the electronic device (e.g., the processor 120 of FIG. 1) according to certain embodiments may display the first indicator on some objects included in the first category. For example, the electronic device (e.g., the processor 120 of FIG. 1) according to certain embodiments may display the first indicator on at least one object (e.g., as indicated by reference numeral 1202A) among the multiple objects (e.g., as indicated by reference numerals 1201A, 1201B, 1201C, and 1202A of FIG. 12A) included in the same first category (e.g., a person category). The first indicator may be configured as a visual indicator for notifying the user that the application of the first adjustment filter to the at least one selected object (e.g., as indicated by reference numeral 1202A) has been cancelled (i.e., the displayed object is an object to which an adjustment filter is not applied).

Figure 12B:
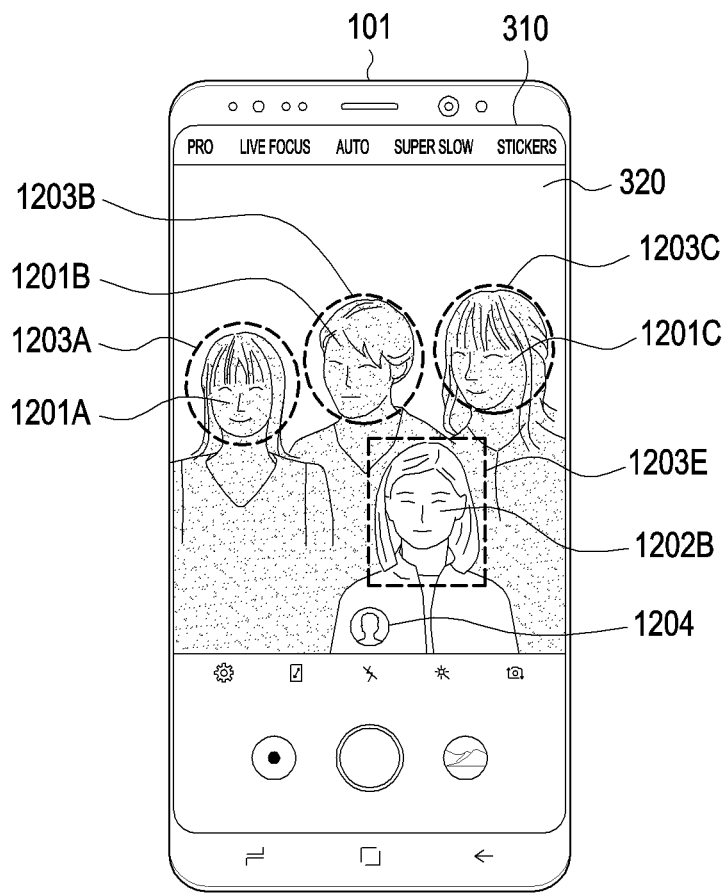
FIG. 12B is a view for explaining an example of an operation of an electronic device for cancelling application of an adjustment filter to some objects among multiple objects included in an identical category according to certain embodiments.

FIG. 12A is a view for explaining an example of an operation of an electronic device (e.g., the processor 120 of FIG. 1) for cancelling application of an adjustment filter to some objects among multiple objects included in an identical category according to certain embodiments. FIG. 12B is a view for explaining an example of an operation of an electronic device (e.g., the processor 120 of FIG. 1) for cancelling application of an adjustment filter to some objects among multiple objects included in an identical category according to certain embodiments.

Referring to FIG. 12A, the electronic device (e.g., the processor 120 of FIG. 1) according to certain embodiments may display a preview image 320 on the display 310. The preview image 320 may include a graphic object 1204 and multiple adjusted objects 1201A, 1201B, 1201C, and 1202A. The multiple adjusted objects may be multiple objects included in an identical category (e.g., a person category). The graphic object 1204 corresponds to a category for which adjustment is performed, and may be configured to visually notify a user that the objects 1201A, 1201B, 1201C, and 1202A included in a person category have been determined. Multiple indicators 1203A, 1203B, 1203C, and 1203D may be displayed for the multiple adjusted objects 1201A, 1201B, 1201C, and 1202A, respectively. The multiple indicators 1203A, 1203B, 1203C, and 1203D may be configured to notify the user that the multiple adjusted objects 1201A, 1201B, 1201C, and 1202A are objects to which an adjustment filter is applied.

The electronic device 101 according to certain embodiments may perform operations 1110 to 1130 described above with reference to FIG. 11, and thus may display the preview image illustrated in FIG. 12B.

Referring to FIG. 12B, the electronic device (e.g., the processor 120 of FIG. 1) according to certain embodiments may display a preview image 320 on the display 310. The preview image 320 may include some objects 1202B among multiple objects included in an identical category, such that the application of an adjustment filter to the some objects 1202B is cancelled. An indicator 1203E may be displayed for the some objects 1202B for which the adjustment filter having been applied thereto is cancelled. The indicator 1203E may be configured to notify the user that the application of the adjustment filter to the object (e.g., some objects 1202B), where the indicator is displayed, is cancelled. According to certain embodiments, the indicator 1203E may be displayed to have a shape, a form, a color, or a size different from those of the multiple indicators 1201A, 1201B, 1201C, and 1201D illustrated in FIG. 12A, and this configuration is only an example. When the application of an adjustment filter to some objects among multiple included in an identical category is cancelled, the electronic device (e.g., the processor 120 of FIG. 1) according to an embodiment may not change at least one of a shape, a form, color, or size of the graphic object 1204. When the application of an adjustment filter to each of multiple objects included in an identical category is cancelled, the electronic device 101 according to certain embodiments may change a color or a shape of the graphic object 1204 or may not display the graphic object 1204.

Figure 13:
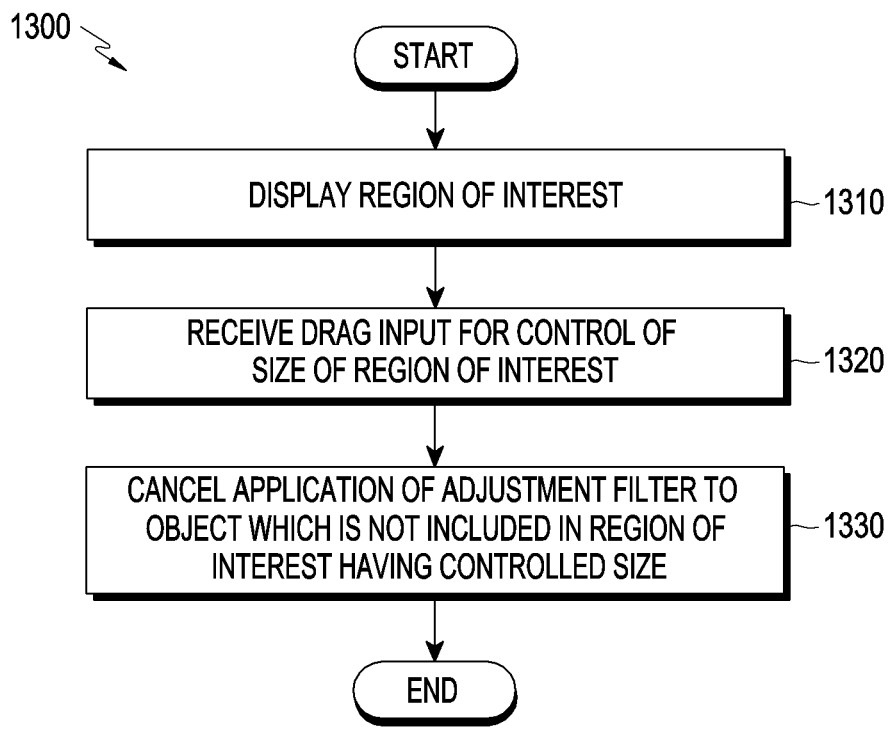
FIG. 13 is a flowchart illustrating an example of an operation of adjusting at least one object by using a region of interest according to certain embodiments.

FIG. 13 is a flowchart 1300 illustrating an example of a method for adjusting at least one object by using a region of interest.

Figure 14A:
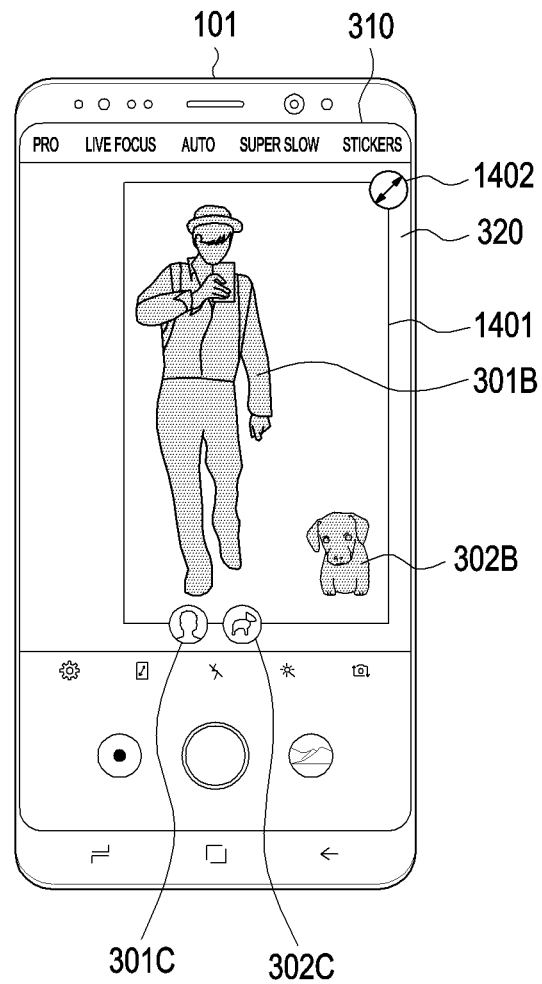
FIG. 14A is a view for explaining an example of an operation of adjusting at least one object by using a region of interest.
Figure 14B:
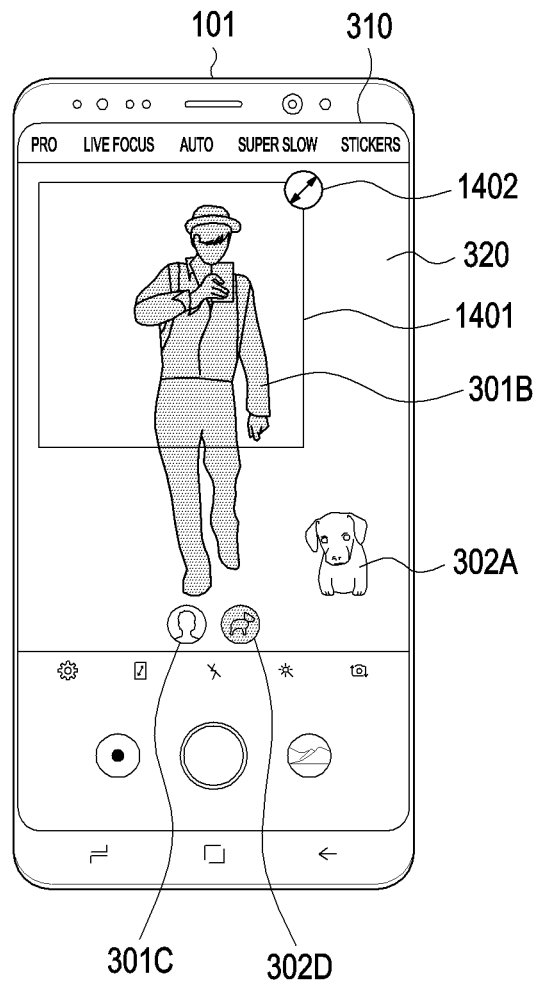
FIG. 14B is a view for explaining an example of an operation of adjusting at least one object by using a region of interest.
Figure 14C:
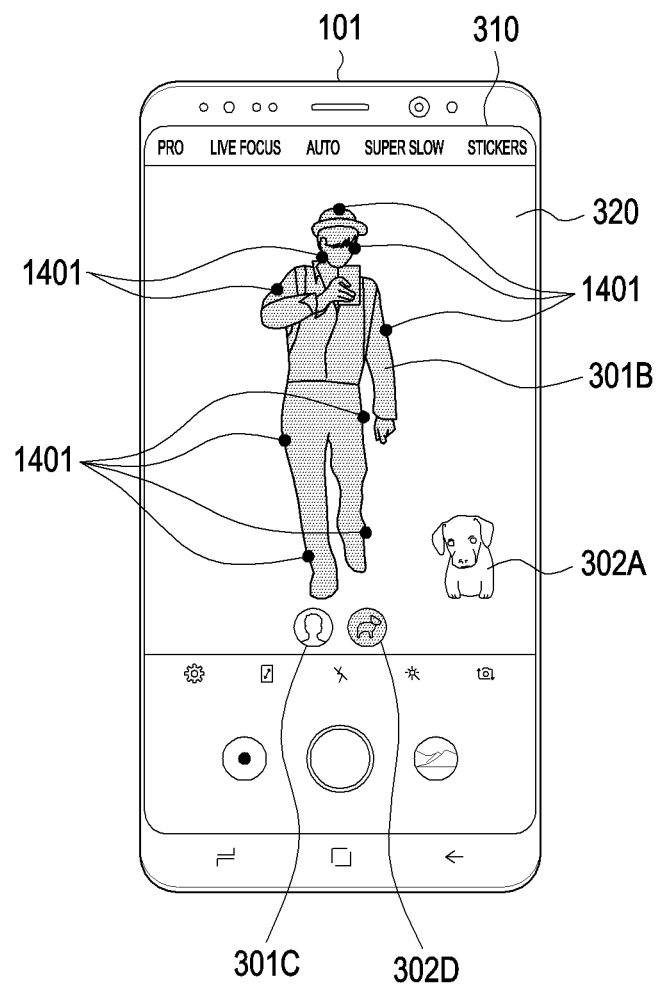
FIG. 14C is a view for explaining an example of an operation of adjusting at least one object by using a region of interest.

In operation 1310, the electronic device (e.g., the processor 120 of FIG. 1) according to certain embodiments may display a region of interest. The electronic device (e.g., the processor 120 of FIG. 1) according to certain embodiments may display a region of interest on a display (e.g., the display 310 of FIG. 14A, 14B, or 14C). The electronic device (e.g., the processor 120 of FIG. 1) according to certain embodiments may display a region of interest so as to include all of the at least one object, the category of which has been identified, (e.g., an object, the category of which has been identified in operations 220 to 240 of FIG. 2) among multiple objects included in a preview image. For example, as illustrated in FIG. 14A, the electronic device (e.g., the processor 120 of FIG. 1) according to certain embodiments may identify categories of multiple objects (e.g., a first object 301B and a second object 302B) included in an image, and may display a region of interest so as to include all of the objects (e.g., the first object 301B is a person and the second object 302B is an animal), the categories of which have been identified. For example, as illustrated in FIG. 14A, a region of interest may be displayed in a quadrangular shape (e.g., a region of interest 1401 of FIG. 14A) or in a closed curve including at least one control tool 1402. According to an embodiment, as illustrated in FIG. 14C, a region of interest may be displayed as at least one figure (e.g., a circle) (e.g., a region of interest 1401 of FIG. 14C) positioned along the outline of at least one object. The region of interest may be displayed to the user so as to include multiple objects by using various other methods. The electronic device (e.g., the processor 120 of FIG. 1) according to certain embodiments may apply adjustment filters corresponding to categories, to the objects included in the region of interest (e.g., the region of interest 1401 of FIG. 14A), respectively.

In operation 1320, the electronic device (e.g., the processor 120 of FIG. 1) according to certain embodiments may receive a drag input for control of a size of the region of interest. The electronic device (e.g., the processor 120 of FIG. 1) according to certain embodiments may receive, from the user, an input for dragging a control tool (e.g., the control tool 1402 of FIG. 14A). The electronic device 101 according to an embodiment may receive, from the user, an input for dragging the edge of the region of interest (e.g., the region of interest 1401 of FIG. 14A or the region of interest 1401 of FIG. 14C). The electronic device 101 according to an embodiment may receive, from the user, an input for dragging some of at least one figure (e.g., a circle) included in the region of interest (e.g., the region of interest 1401 of FIG. 14C). This configuration is only an example, and the electronic device 101 may receive various inputs for control of a size of the region of interest (e.g., the region of interest 1401 of FIG. 14A, FIG. 14B, or FIG. 14C). The electronic device 101 according to certain embodiments may control a size of the region of interest (e.g., the region of interest 1401 of FIG. 14A or the region of interest 1401 of FIG. 14C) on the basis of a drag input received from the user.

In operation 1330, the electronic device (e.g., the processor 120 of FIG. 1) according to certain embodiments may cancel the application of an adjustment filter to an object which is excluded from the region of interest as the size of the region of interest is altered by the drag. When the size of the region of interest (e.g., the region of interest 1401 of FIG. 14A) is changed by the drag, the electronic device (e.g., the processor 120 of FIG. 1) according to certain embodiments may cancel the application of an adjustment filter (e.g., an animal adjustment filter) to an object (e.g., the second object 302A of FIG. 14B) which is disposed outside of the region of interest (e.g., the region of interest 1401 of FIG. 14B) as the size of the region of interest is changed by the drag. When there are multiple objects included in the same category as that of the object (e.g., the second object 302A of FIG. 14B) which is not included in the region of interest (e.g., the region of interest 1401 of FIG. 14B), the electronic device 101 according to an embodiment may cancel application of an adjustment filter to each of the multiple objects included in the same category as that of the object (e.g., the second object 302A of FIG. 14B) which is not included in the region of interest.

FIG. 14A is a view for explaining an example of a method for adjusting at least one object by using a region of interest. FIG. 14B is a view for explaining an example of a method for adjusting at least one object by using a region of interest. FIG. 14C is a view for explaining an example of a method for adjusting at least one object by using a region of interest. The contents described above with reference to FIG. 13 will be omitted or be briefly described.

Referring to FIG. 14A, the electronic device (e.g., the processor 120 of FIG. 1) according to certain embodiments may display an image, received from a camera (e.g., the camera module 180 of FIG. 1), as a preview image 320 on the display 310 (e.g., the display device 160 of FIG. 1). The preview image 320 may include multiple objects (e.g., a first object 301A and a second object 302A), a region of interest 1401, and multiple graphic objects (e.g., a first graphic object 301C and a second graphic object 302C). The region of interest 1401 may be displayed, including a control tool 1402. The electronic device 101 according to an embodiment may display a region of interest so as to include all of the at least one object, the category of which has been identified, (e.g., an object, the category of which has been identified in operation 220 of FIG. 2) among the multiple objects (e.g., the first object 301A and the second object 302A) included in a preview image.

Referring to FIG. 14B, when a drag input for control of a size of the region of interest 1401 by a user is received, the electronic device (e.g., the processor 120 of FIG. 1) according to certain embodiments may control the size of the region of interest 1401 and may display, on the display 310, the region of interest 1401 having the controlled size. The electronic device 101 according to certain embodiments may cancel application of an adjustment filter (e.g., an animal adjustment filter) to an object (e.g., the second object 302A) which is not included in the region of interest 1401 having the controlled size. When there are multiple objects included in the same category as that of the object (e.g., the second object 302A) which is not included in the region of interest 1401, the electronic device 101 according to an embodiment may cancel application of an adjustment filter to each of the multiple objects included in the same category as that of the object (e.g., the second object 302A) which is not included in the region of interest 1401. When the application of the adjustment filter to the second object 302A is cancelled, the electronic device 101 according to certain embodiments may change and display at least one of a shape, a form, or a size of a second graphic object (e.g., the second graphic object 302C of FIG. 14A) corresponding to the second object 302B. For example, as illustrated in FIG. 14B, the electronic device 101 according to certain embodiments may display the second graphic object as the shaded second graphic object 302D, and this configuration is only an example.

Referring to FIG. 14C, the electronic device (e.g., the processor 120 of FIG. 1) according to certain embodiments may display a region of interest 1401 as at least one figure (e.g., a circle) positioned along the outline of at least one object. The electronic device 101 according to certain embodiments may receive, from the user, an input for dragging some of the at least one figure (e.g., a circle) included in the region of interest 1401, and may control a size of the region of interest 1401, according to the received input.

Figure 15:
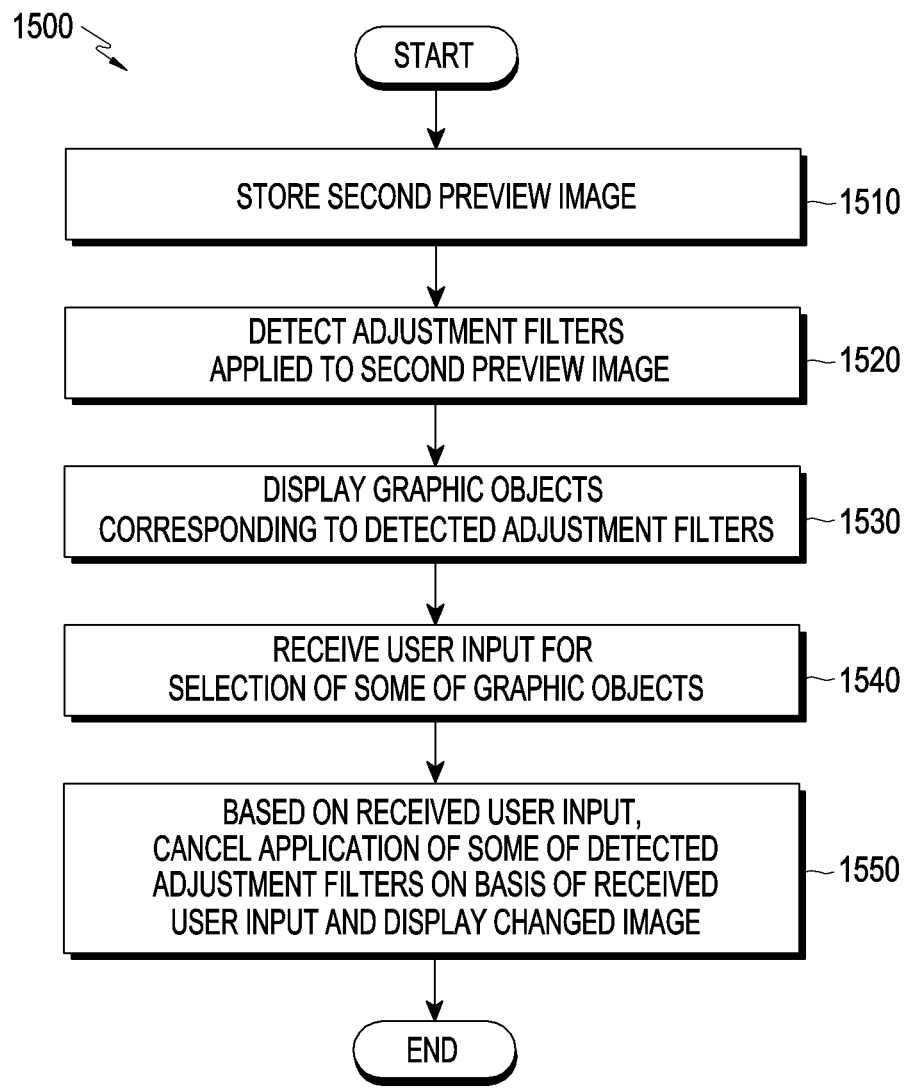
FIG. 15 is a flowchart illustrating an example of an operation of an electronic device for cancelling some of applied adjustment filters by using a stored image according to certain embodiments.

FIG. 15 is a flowchart 1500 illustrating an example of a method of an electronic device for cancelling some of applied adjustment filters by using a stored image according to certain embodiments.

In operation 1510, the electronic device (e.g., the processor 120 of FIG. 1) according to certain embodiments may store a second preview image (e.g., a "capture image").

For example, the electronic device (e.g., the processor 120 of FIG. 1) according to certain embodiments may store, in a memory (e.g., the memory 130 of FIG. 1), an image (e.g., an image to be stored) corresponding to a preview image (e.g., a second preview image) to which an adjustment filter has been applied or for which the application of the adjustment filter thereto has been cancelled, in operations 210 to 270 of FIG. 2. The electronic device 101 according to certain embodiments may store information on the adjustment filter applied to the preview image together with or in association with an image to be stored, or may store an image to be stored and an original image (i.e., an image to which an adjustment filter is not applied) in association with each other. The image to be stored in the memory may be configured to have a resolution higher than that of the preview image. The electronic device 101 according to an embodiment may store information on an adjustment filter which is not applied to the preview image together with or in association with the image to be stored, so that the information on the adjustment filter applied to the preview image can also include the information on the adjustment filter which is not applied to the preview image. For example, the electronic device 101 may also store, together with or in association with the image to be stored, information on an adjustment filter (e.g., a mountain adjustment filter) corresponding to an object (e.g., a third object 303A of FIG. 16A) included in a category which has been identified but to which an adjustment filter is not applied, among multiple objects included in an image. Hereinafter, for convenience of description, a description will be made on the assumption that an image to be stored is identical to a preview image.

In operation 1520, the electronic device (e.g., the processor 120 of FIG. 1) according to certain embodiments may detect adjustment filters applied to the second preview image. The electronic device (e.g., the processor 120 of FIG. 1) according to certain embodiments may identify the information on the adjustment filters applied to the second preview image, which has been stored together with or in association with the stored image. The electronic device 101 according to certain embodiments may detect the adjustment filters applied to the second preview image, on the basis of the information on the adjustment filters applied to the second preview image. For example, referring to FIG. 16A, the electronic device 101 according to certain embodiments may detect adjustment filters (e.g., a person adjustment filter and an animal adjustment filter) applied to the second preview image (e.g., a stored image 330 of FIG. 16A).

Figure 16A:
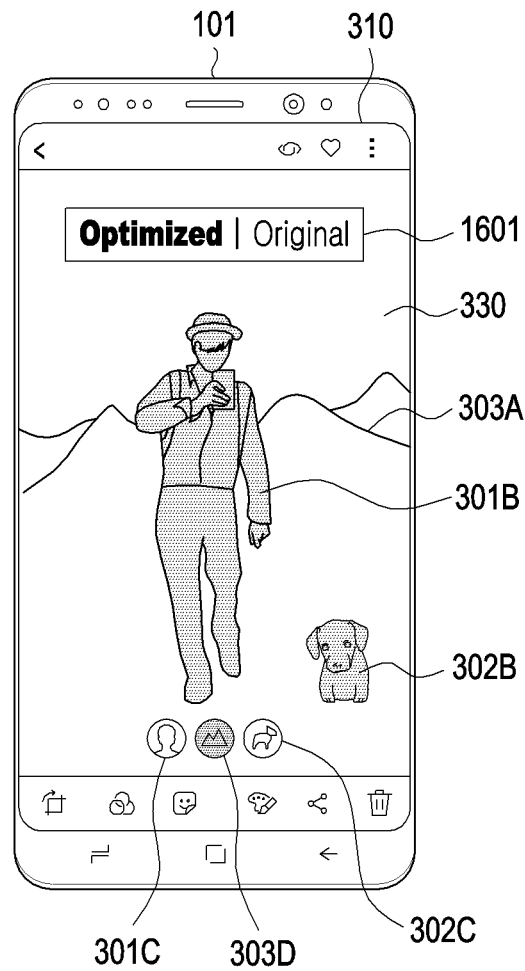
FIG. 16A is a view for explaining an example of an operation of an electronic device for cancelling some of applied adjustment filters by using a stored image according to certain embodiments.

In operation 1530, the electronic device (e.g., the processor 120 of FIG. 1) according to certain embodiments may display graphic objects corresponding to the detected adjustment filters. For example, referring to FIG. 16A, the electronic device 101 according to certain embodiments may display graphic objects (e.g., a first graphic object 301C and a second graphic object 302C of FIG. 16A) corresponding to the detected adjustment filters (e.g., a person adjustment filter and an animal adjustment filter) on a display (e.g., the display 310 of FIG. 16A). For example, the at least one graphic object may be displayed at the bottom of the display. Referring to FIG. 16A, the electronic device 101 according to an embodiment may display, at the bottom of the display, a graphic object (e.g., a third graphic object 303D of FIG. 16A) corresponding to an object (e.g., a third object 303A of FIG. 16A) to which an adjustment filter is not applied. In this example, the graphic object (e.g., the third graphic object 303D of FIG. 16A) may be shaded and displayed.

In operation 1540, the electronic device (e.g., the processor 120 of FIG. 1) according to certain embodiments may receive a user input for selection of some of the graphic objects. For example, referring to FIG. 16A, the electronic device (e.g., the processor 120 of FIG. 1) according to certain embodiments may receive a user input for selection of some (e.g., the second graphic object 302C of FIG. 16A) of the graphic objects (e.g., the first graphic object 301C and the second graphic object 302C of FIG. 16A) corresponding to the detected adjustment filters (e.g., a person adjustment filter and an animal adjustment filter).

In operation 1550, the electronic device (e.g., the processor 120 of FIG. 1) according to certain embodiments may cancel the application of some of the detected adjustment filters on the basis of the received user input, and thus may display a changed image. For example, the electronic device (e.g., the processor 120 of FIG. 1) according to certain embodiments may cancel the application of some (e.g., an animal adjustment filter) of the detected adjustment filters on the basis of a user input for selection of a graphic object (e.g., the second graphic object 302C of FIG. 16A), and thus may display a changed image on the display 310. The electronic device 101 according to certain embodiments may cancel the application of the adjustment filter to an adjusted object (e.g., the adjusted second object 302B of FIG. 16A) included in a second category, may change a stored image so that the stored image can include a non-adjusted object (e.g., the second object 302A of FIG. 16C) included in the second category, and may display the changed image on the display 310.

Figure 16B:
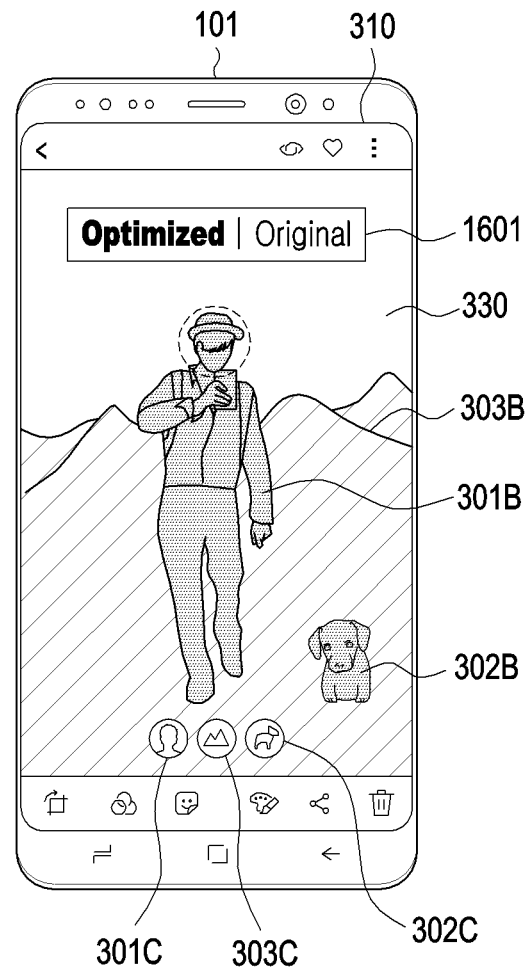
FIG. 16B is a view for explaining an example of an operation of an electronic device for cancelling some of applied adjustment filters by using a stored image according to certain embodiments.
Figure 16C:
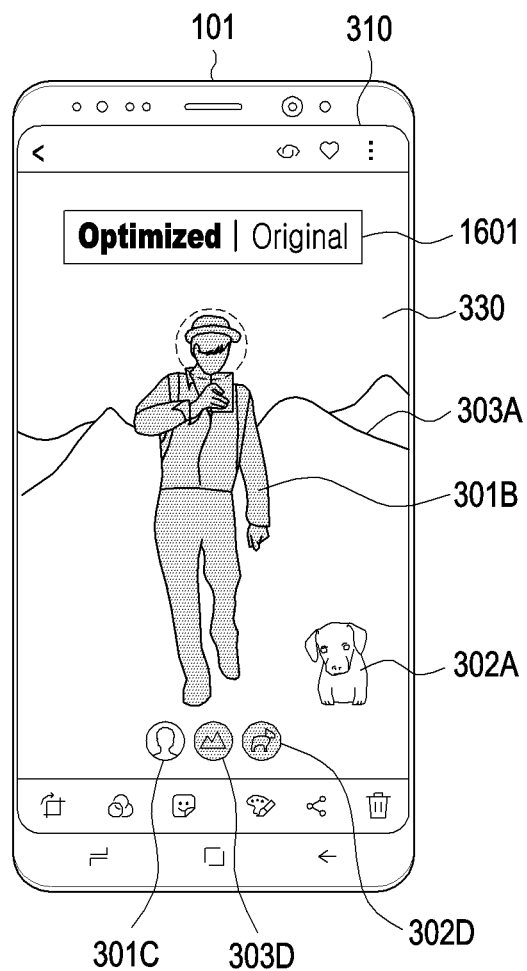
FIG. 16C is a view for explaining an example of an operation of an electronic device for cancelling some of applied adjustment filters by using a stored image according to certain embodiments.
Figure 16D:
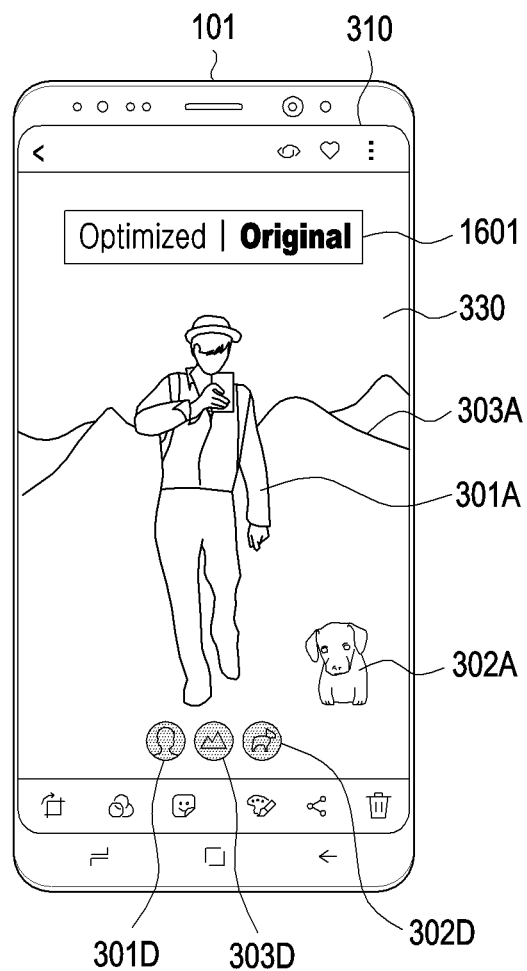
FIG. 16D is a view for explaining an example of an operation of an electronic device for cancelling some of applied adjustment filters by using a stored image according to certain embodiments.

FIG. 16A is a view for explaining an example of an operating method of an electronic device using a stored image according to certain embodiments. FIG. 16B is a view for explaining an example of an operating method of an electronic device using a stored image according to certain embodiments. FIG. 16C is a view for explaining an example of an operating method of an electronic device using a stored image according to certain embodiments. FIG. 16D is a view for explaining an example of an operating method of an electronic device using a stored image according to certain embodiments.

Referring to FIG. 16A, the electronic device (e.g., the processor 120 of FIG. 1) according to certain embodiments may display, on the display 310, an image 330 stored in a memory (e.g., the memory 130 of FIG. 1), an adjustment indicator 1601, and multiple graphic objects (e.g., a first graphic object 301C, a second graphic object 302C, and a third graphic object 303D). The stored image 330 may include multiple objects (e.g., a first object 301B, a second object 302B, and a third object 303A). According to certain embodiments, the adjustment indicator 1601 may be configured to notify a user of whether the stored image 330 includes at least one object (hereinafter referred to as an "adjusted object") to which an adjustment filter is applied. For example, when the stored image 330 includes at least one adjusted object (e.g., the first object 301B and the second object 302B), the adjustment indicator 1601 may be displayed to include the word "Optimized" in bold type as illustrated in FIG. 16A. According to certain embodiments, the multiple graphic objects (e.g., the first graphic object 301C, the second graphic object 302C, and the third graphic object 303D) may include: graphic objects (e.g., the first graphic object 301C and the second graphic object 302C) corresponding to adjustment filters applied to objects included in the stored image and a graphic object (e.g., the third graphic object 303C) corresponding to an adjustment filter which is not applied to an object included in the stored image. A graphic object corresponding to the applied adjustment filter and a graphic object corresponding to the non-applied adjustment filter may be displayed to have different background colors, as illustrated in FIG. 16A. The electronic device 101 according to certain embodiments may receive a user input for selection of at least one of the multiple graphic objects (e.g., the first graphic object 301C, the second graphic object 302C, and the third graphic object 303D).

Referring to FIG. 16B, when a user input for selection of the third graphic object 303D is received as described above with reference to FIG. 16A, the electronic device (e.g., the processor 120 of FIG. 1) according to certain embodiments may apply, to the third object 303A, an adjustment filter (e.g., a mountain adjustment filter) corresponding to the third graphic object 303D. In this example, the stored image 330 may be displayed to include the adjusted third object 303B. The third graphic object 303C has a state obtained by changing at least one of a shape, a form, a color, or a size of the third graphic object 303D illustrated in FIG. 16A, and may be displayed in this state on the display 310.

Referring to FIG. 16C, when a user input for selection of the second graphic object 302C is received as described above with reference to FIG. 16A, the electronic device (e.g., the processor 120 of FIG. 1) according to certain embodiments may cancel the application of the adjustment filter (e.g., an animal adjustment filter) to the adjusted second object 302B. In this example, the stored image 330 may be displayed on the display 310 so as to include the second object 302A for which the application of the adjustment filter thereto is cancelled. The second graphic object 302D has a state obtained by changing at least one of a shape, a form, a color, or a size of the second graphic object 302C illustrated in FIG. 16A and may be displayed in this state on the display 310.

Referring to FIG. 16D, when a user input for selection of each of the first graphic object 301C and the third graphic object 303C is received as described above with reference to FIG. 16A, the electronic device (e.g., the processor 120 of FIG. 1) according to certain embodiments may cancel the application of an adjustment filter (e.g., a person adjustment filter) to the adjusted first object 301B and the application of an adjustment filter (e.g., a mountain adjustment filter) to the adjusted third object 303B. In this example, the stored image 330 may be displayed to include the first object 301A and the third object 303A for which the application of the adjustment filters thereto is cancelled. The first graphic object 301D has a state obtained by changing at least one of a shape, a form, a color, or a size of the first graphic object 301C illustrated in FIG. 16A and may be displayed in this state on the display 310. In addition, the third graphic object 303D has a state obtained by changing at least one of a shape, a form, a color, or a size of the third graphic object 303C illustrated in FIG. 16A, and may be displayed in this state on the display 310. When it is identified that the stored image 330 does not include any adjusted object, the electronic device 101 according to certain embodiments may display the adjustment indicator 1601 so that the adjustment indicator 1601 can include the word "Original" in bold type as illustrated in FIG. 16D.

Figure 17A:
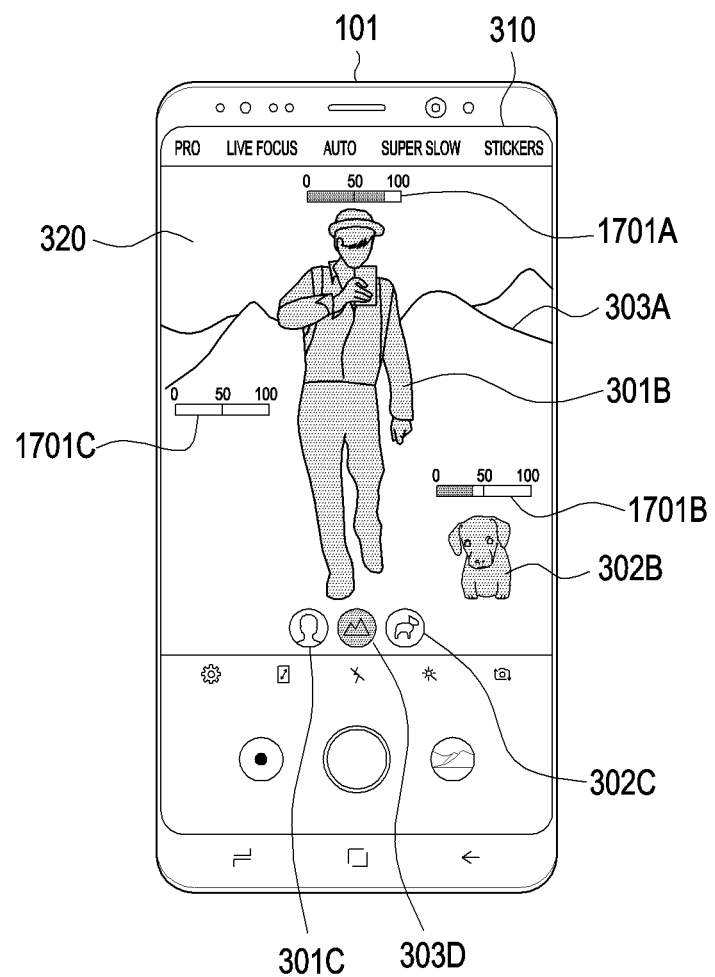
FIG. 17A is a view for explaining an example of an operation of electronic device for adjusting the strength of application of an adjustment filter according to certain embodiments.
Figure 17B:
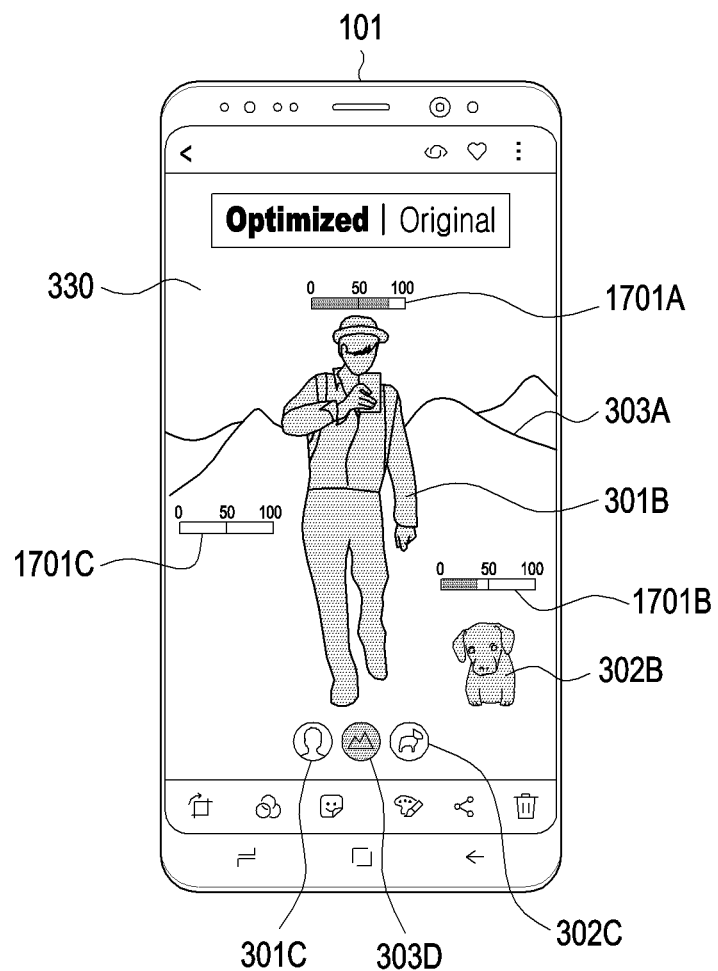
FIG. 17B is a view for explaining an example of an operation of electronic device for adjusting the strength of application of an adjustment filter according to certain embodiments.

FIG. 17A is a view for explaining an example of an operation of electronic device for adjusting the strength of application of an adjustment filter according to certain embodiments. FIG. 17B is a view for explaining an example of an operation of electronic device for adjusting the strength of application of an adjustment filter according to certain embodiments.

Referring to FIG. 17A, the electronic device (e.g., the processor 120 of FIG. 1) according to certain embodiments may display, on the display 310, a preview image 320, multiple adjustment filter control bars (e.g., a first adjustment filter control bar 1701A, a second adjustment filter control bar 1701B, and a third adjustment filter control bar 1701C), and multiple graphic objects (e.g., a first graphic object 301C, a second graphic object 302C, and a third graphic object 303D). The preview image 320 may include a first object 301B, a second object 302B, and a third object 303A. The first object 301B and the second object 302B may be adjusted objects. The multiple adjustment filter control bars (e.g., the first adjustment filter control bar 1701A, the second adjustment filter control bar 1701B, and the third adjustment filter control bar 1701C) may indicate application strengths of adjustment filters applied to corresponding multiple objects (e.g., the first object 301B, the second object 302B, and the third object 303A), respectively. For example, the first adjustment filter control bar 1701A may indicate that a person adjustment filter is applied to the first object 301B by as much strength as 80%, the second adjustment filter control bar 1701B may indicate that an animal adjustment filter is applied to an adjusted second object 302B by as much strength as 40%, and the third adjustment filter control bar 1701C may indicate that a mountain adjustment filter is not applied to the third object 303A.

The electronic device (e.g., the processor 120 of FIG. 1) according to certain embodiments may receive a user input for selection of multiple adjustment filter control menu items. When an input for dragging (e.g., dragging to the left or right) at least one adjustment filter control bar among the multiple adjustment filter control bars is received from a user, the electronic device 101 according to certain embodiments may control a strength of an adjustment filter applied to an object corresponding to the at least one adjustment filter control bar. For example, when a user input for dragging the first adjustment filter control bar to the left or right is received, the electronic device 101 according to certain embodiments may control such that an application strength of a person adjustment filter applied to the first object 301B is reduced or increased. When a user input for dragging the third adjustment filter control bar to the right is received, the electronic device 101 according to certain embodiments may apply, to the third object 303A, an adjustment filter (e.g., a mountain adjustment filter) corresponding to a category of the third object 303A, and may display the applied strength on the third adjustment filter control bar. In this example, the third graphic object 303D may be displayed in a state where at least one of a shape, a form, a color, or size is changed.

Referring to FIG. 17B, the electronic device (e.g., the processor 120 of FIG. 1) according to certain embodiments may display, on a stored image 330, the stored image 330, multiple adjustment filter control bars (e.g., a first adjustment filter control bar 1701A, a second adjustment filter control bar 1701B, and a third adjustment filter control bar 1701C), and multiple graphic objects (e.g., a first graphic object 301C, a second graphic object 302C, and a third graphic object 303D). The stored image 330 may include a first object 301B, a second object 302B, and a third object 303A. The first object 301B and the second object 302B may be adjusted objects.

The electronic device (e.g., the processor 120 of FIG. 1) according to certain embodiments may receive a user input for selection of multiple adjustment filter control menu items. When an input for dragging (e.g., dragging to the left or right) at least one adjustment filter control bar among the multiple adjustment filter control bars is received from a user, the electronic device 101 according to certain embodiments may control a strength of an adjustment filter applied to an object corresponding to the at least one adjustment filter control bar.

Figure 18:
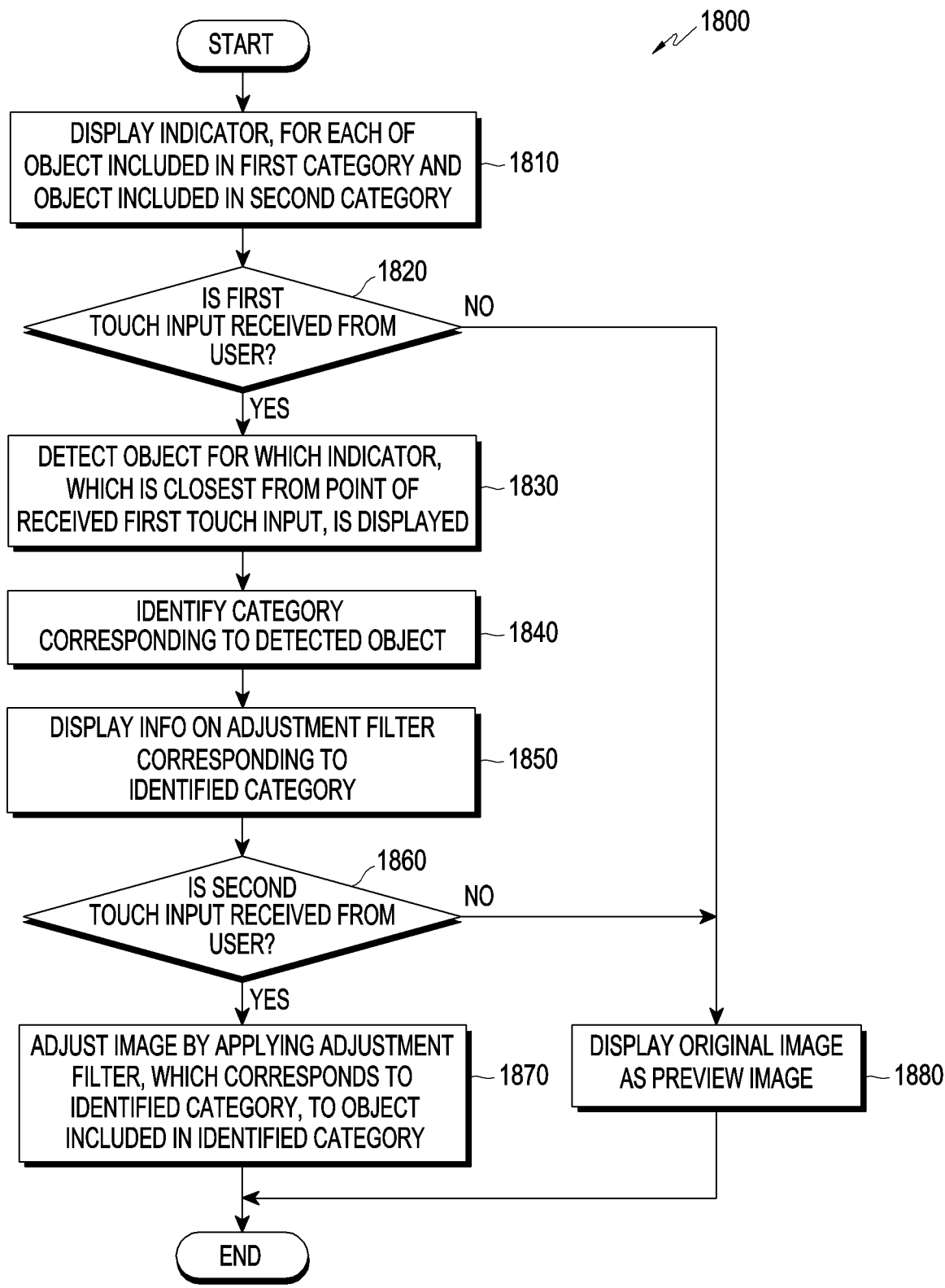
FIG. 18 is a flowchart illustrating an example of an operation of an electronic device for selecting an object to be adjusted according to certain embodiments.

FIG. 18 is a flowchart 1800 illustrating an example an operation of an electronic device (e.g., the processor 120 of FIG. 1) for selecting an object to be adjusted according to certain embodiments.

Figure 19A:
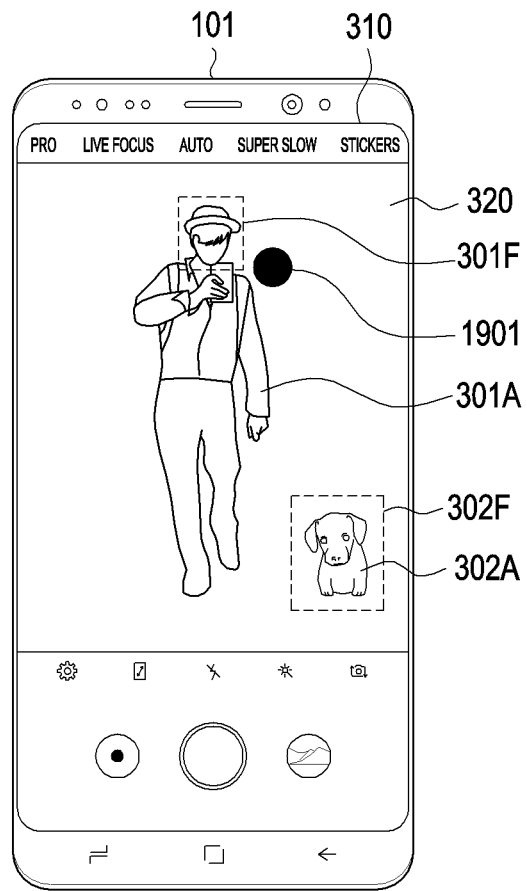
FIG. 19A is a view for explaining an example of an operation of an electronic device for selecting an object to be adjusted according to certain embodiments.

In operation 1810, the electronic device (e.g., the processor 120 of FIG. 1) according to certain embodiments may display an indicator, for each of an object included in a first category and an object included in a second category. For example, as illustrated in FIG. 19A, the electronic device 101 according to certain embodiments may display a first indicator 301F and a second indicator 302F, for a first object 301A included in a person category and a second object 302A included in an animal category, respectively. Each of the first indicator 301F and the second indicator 302F may be configured as a visual indicator for notifying a user that the object, where the indicator is displayed, is an object, the category of which has been identified.

In operation 1820, the electronic device (e.g., the processor 120 of FIG. 1) according to certain embodiments may determine whether a first touch input is received from the user. The first touch input is an input made by the user at any point (e.g., a touch input point 1901 of FIG. 19A) on a preview image (e.g., a preview image 320 of FIG. 19A).

When the first touch input is not received, in operation 1880, the electronic device (e.g., the processor 120 of FIG. 1) according to certain embodiments may display an original image as a preview image. That is, the electronic device 101 may display an image, which has been received from a camera and to which an adjustment filter is not applied, as a preview image on a display (e.g., the display 310 of FIG. 3).

In operation 1830, the electronic device (e.g., the processor 120 of FIG. 1) according to certain embodiments may detect an object for which an indicator, which is closest from a point of the received first touch input, is displayed. When multiple indicators are displayed on the display (e.g., the display 310 of FIG. 19A), the electronic device (e.g., the processor 120 of FIG. 1) according to certain embodiments may detect an object for which an indicator, which has the shortest direct distance from a point of the received first touch input, is displayed. For example, referring to FIG. 19A, the electronic device 101 according to certain embodiments may identify a direct distance from a center point of each of multiple indicators (e.g., the first indicator 301F and the second indicator 302F) to a point of the first touch input (e.g., the touch input point 1901 of FIG. 19A), and may detect an object (e.g., the first object 301A) for which an indicator (e.g., the first indicator 301F) having the shortest direct distance is displayed.

In operation 1840, the electronic device (e.g., the processor 120 of FIG. 1) according to certain embodiments may identify a category of the detected object. For example, referring to FIG. 19A, the electronic device (e.g., the processor 120 of FIG. 1) according to certain embodiments may identify a category (e.g., a person category) of the detected object (e.g., the first object 301A).

In operation 1850, the electronic device (e.g., the processor 120 of FIG. 1) according to certain embodiments may display information on an adjustment filter corresponding to the identified category. The electronic device (e.g., the processor 120 of FIG. 1) according to certain embodiments may display, on the display (e.g., the display 310 of FIG. 3), information on an adjustment filter (e.g., a person adjustment filter) corresponding to the identified category (e.g., a person category). The information on the adjustment filter may include at least one piece of information among information on the category to which the adjustment filter is applied, and information on an object to which the adjustment filter is to be applied.

In operation 1860, the electronic device (e.g., the processor 120 of FIG. 1) according to certain embodiments may determine whether a second touch input is received from the user. The second touch input may be a user input which causes an adjustment filter corresponding to the category identified in operation 1840 to be applied to the object detected in operation 1830.

When the second touch input is not received from the user, in operation 1880, the electronic device (e.g., the processor 120 of FIG. 1) according to certain embodiments may display an original image as a preview image.

In operation 1870, the electronic device (e.g., the processor 120 of FIG. 1) according to certain embodiments may adjust an image by applying an adjustment filter, which corresponds to the identified category, to an object included in the identified category. For example, referring to FIG. 19A, the electronic device (e.g., the processor 120 of FIG. 1) according to certain embodiments may adjust an image by applying an adjustment filter (e.g., a person adjustment filter), which corresponds to the identified category (e.g., a person category), to an object (e.g., the first object 301A) included in the identified category.

Figure 19B:
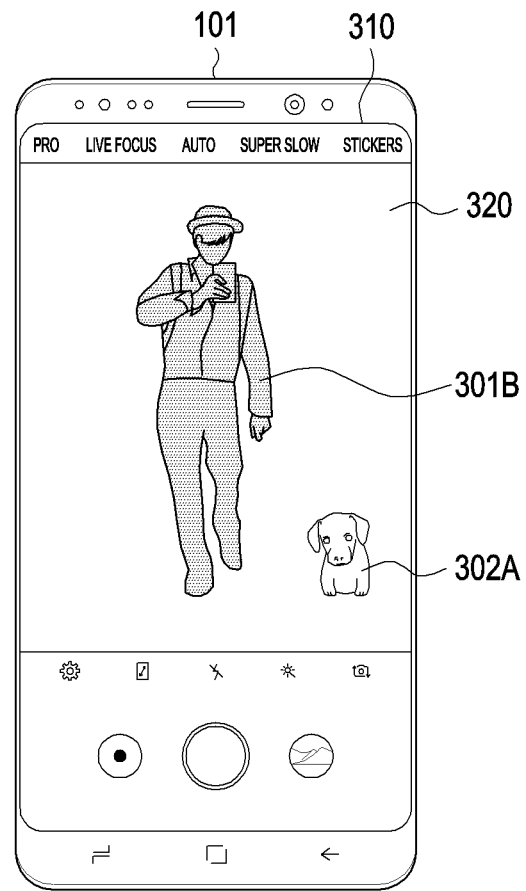
FIG. 19B is a view for explaining an example of an operation of an electronic device for selecting an object to be adjusted according to certain embodiments.

FIG. 19A is a view for explaining an example an operation of an electronic device (e.g., the processor 120 of FIG. 1) for selecting an object to be adjusted according to certain embodiments. FIG. 19B is a view for explaining an example an operation of an electronic device (e.g., the processor 120 of FIG. 1) for selecting an object to be adjusted according to certain embodiments.

Referring to FIG. 19A, the electronic device (e.g., the processor 120 of FIG. 1) according to certain embodiments may display, on the display 310, a preview image 320 and multiple indicators (e.g., a first indicator 301F and a second indicator 302F). The preview image 320 may include a first object 301A and a second object 302A. When a first touch input is received from a user, the electronic device 101 according to certain embodiments may detect the first object 301A for which the first indicator 301F, which is closest from a touch input point 1901 of the first touch input, is displayed among the multiple indicators (e.g., the first indicator 301F and the second indicator 302F). The electronic device 101 according to certain embodiments may identify a category of the first object 301A. The electronic device 101 according to certain embodiments may adjust an image by applying, to the first object 301A, an adjustment filter (e.g., a person adjustment filter) corresponding to the identified category (e.g., a person category) of the first object 301A. When the preview image 320 includes multiple objects belonging to the identified category (e.g., a person category) of the first object, the electronic device according to an embodiment may also adjust the image (e.g., the preview image 320) by applying an adjustment filter, which corresponds to the identified category of the first object, to the multiple objects included in the identified category of the first object.

Referring to FIG. 19B, the electronic device (e.g., the processor 120 of FIG. 1) according to certain embodiments may display the adjusted image as the preview image 320. The electronic device 101 according to certain embodiments may display the adjusted image including the adjusted first object 301B as the preview image 320 on the display 310.

An electronic device (e.g., the electronic device 101 of FIG. 1) according to certain embodiments may include: a display (e.g., the display device 160 of FIG. 1); a camera (e.g., the camera module 180 of FIG. 1); and at least one processor (e.g., the processor 120 of FIG. 1) configured to be operatively connected to the camera and the display, wherein the at least one processor is configured to: display a first preview image acquired through the camera on the display; identify a category for each object included in the first preview image; apply adjustment filters to each object, each adjustment filter selected based on a respective category for each object; display a second preview image on the display, in which each object is visually altered by the applied adjustment filter; display on the second preview image a plurality of selectable icons corresponding to one of the identified categories; in response to receiving a first input selecting a first selectable icon, remove application of a first adjustment filter from a first object belonging to a category corresponding to the first selectable icon.

The electronic device according to certain embodiments may further include a memory configured to store a plurality of reference images each corresponding to a plurality of categories, and the at least one processor may be configured to compare each object to the stored plurality of reference images to detect the identified category from a match with one of the reference images.

The adjustment filter for each object according to certain embodiments may be selected based on a pre-association of the adjustment filter with the identified category for each object.

The at least one processor according to certain embodiments may be further configured to: after removing application of the first adjustment filter from the first object, receive a second input selecting the first selectable icon, and in response to receiving the second input, re-apply the first adjustment filter to the first object.

The at least one processor according to certain embodiments may be configured to, after removing application of the first adjustment filter from the object, display a first indicator on the display indicating cancellation of the application of the first adjustment filter.

The at least one processor according to certain embodiments may be configured to: after applying adjustment filters to each object, receive a third input selecting a first object included in the second preview image, and in response to the third input, remove application of a second adjustment filter from the first object.

The application of the adjustment filters according to certain embodiments may include visually changing at least one of a shape, form, color and size for each object.

The at least one processor according to certain embodiments may be configured to display a region of interest on the second preview image, the region of interest including visually altered objects by the applied adjustment filters, and when a drag input resizes the region of interest such that a second object is excluded from the region of interest, remove application of a second adjustment filter from the second object.

According to certain embodiments, the region of interest may be displayed as at least one of a quadrangle and a closed curve.

The at least one processor of the electronic device according to certain embodiments may be further configured to: store in the memory a capture image based on the second preview image including captured objects to which adjustment filters are applied, when the capture image is displayed on the display, displaying additional selectable icons each corresponding to adjustment filters applied to the captured objects, in response to detecting a third input selecting a particular selectable icon, altering the capture image by removing a second adjustment filter from a particular captured object belonging to a particular category corresponding to the particular selectable icon.

A method for controlling an electronic device according to certain embodiments may include: displaying a first preview image acquired through a camera of the electronic device on a display of the electronic device, identifying, by at least one processor, categories for each object included in the first preview image, applying adjustment filters to each object, each adjustment filter selected for each object based on the identified categories, displaying a second preview image on the display, in which each object is visually altered by the applied adjustment filters, displaying on the second preview image a plurality of selectable icons each corresponding to each of the identified categories, and in response to detecting a first input selecting a first selectable icon, removing application of a first adjustment filter from a first object belonging to a category corresponding to the first selectable icon.

The method for controlling an electronic device according to certain embodiments may include storing a plurality of reference images each corresponding to a plurality of categories in a memory of the electronic device, wherein the identifying of the category for each object may include comparing each object to the stored plurality of reference images to detect the identified category based on a match with one of the reference images.

The adjustment filter for each object may be selected based on a pre-association of the adjustment filter with the identified category for each object.

The method for controlling the electronic device according to certain embodiments may further include: after removing application of the first adjustment filter from the first object, receiving a second input selecting the first selectable icon, and in response to receiving the second input, re-applying the first adjustment filter to the first object.

The method for controlling the electronic device according to certain embodiments may further include, after removing application of the first adjustment filter from the object, displaying a first indicator on the display indicating cancellation of the application of the first adjustment filter.

The method for controlling the electronic device according to certain embodiments may further include: after applying adjustment filters to each object, receiving a third input selecting a first object included in the second preview image, and in response to the third input, removing application of a second adjustment filter from the first object.

The application of the adjustment filters according to certain embodiments may include: visually changing at least one of a shape, form, color and size for each object.

The method for controlling the electronic device according to certain embodiments may further include: displaying in a region of interest on the second preview image, the region of interest including visually altered objects by the applied adjustment filters, and when a drag input resizes the region of interest such that a second object is excluded from the region of interest, removing application of a second adjustment filter from the second object.

An electronic device according to certain embodiments may include: a display; a camera; and at least one processor configured to be operatively connected to the camera and the display, such that the at least one processor is configured to: control the display to display an image acquired through the camera as a first preview image, receive a first input selecting a first object from among a plurality of objects included in the first preview image, in response to receiving the first input, identify a category to which the selected first object belongs, control the display to display, on the first preview image, a first selectable icon corresponding to the identified category, receive a second input selecting the first selectable icon, in response to receiving the second input, determine at least one object from among the plurality of objects associated with the identified category including at least the first object, apply, to the determined at least one object, an adjustment filter from among a plurality of adjustment filters corresponding to the identified category, and control the display to display a second preview image including the at least one object visually altered by application of the adjustment filter.

The at least one processor according to certain embodiments may be further configured to control the display to display a first indicator, for the at least one object, wherein the first indicator indicates that the at least one object is included in the category to which the first object belongs.

An electronic device according to certain embodiments disclosed herein may be various types of devices. Examples of the electronic device may include at least one of a portable communication device (e.g., a smartphone) a computer device, a portable multimedia device, a portable medical device, a camera, a wearable device, or a home appliance. The electronic device according to embodiments is not limited to the above-described devices.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Such that, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a display;
   a camera; and
   at least one processor operatively coupled to the camera and the display, wherein the at least one processor is configured to:
   display a first preview image acquired through the camera on the display, wherein the first preview image includes a plurality of objects;
   identify a category for each object included in the first preview image, wherein at least one object of the plurality of objects is identified as a first category and a first object of the plurality of objects is identified as a second category;
   based on identifying the category for each object, apply a first adjustment filter corresponding to the first category to the at least one object, and apply a second adjustment filter corresponding to the second category to the first object;
   display, on the display, a second preview image including the at least one object visually adjusted based on the applied first adjustment filter and the first object visually adjusted based on the applied second adjustment filter;
   display, on the second preview image, a first selectable icon corresponding to the first category and a second selectable icon corresponding to the second category;
   receive a first input for selecting the first selectable icon; and
   in response to receiving the first input, identify the first category corresponding to the first selectable icon and remove application of the first adjustment filter from the adjusted at least one object based on the identified first category, while application of the second adjustment filter to the first object is maintained.

2. The electronic device of claim 1, further comprising a memory configured to store a plurality of reference images each corresponding to a plurality of categories,
   wherein the identifying of the category for each object includes comparing each of the plurality of objects to the stored plurality of reference images to identify the category for each object from a match with one of the plurality of reference images.

3. The electronic device of claim 2, wherein each of the first adjustment filter and the second adjustment filter is selected based on a pre-association of an adjustment filter for each object with the category for each object.

4. The electronic device of claim 1, wherein the at least one processor is further configured to:
   after removing application of the first adjustment filter from the at least one object, receive a second input for selecting the first selectable icon; and
   in response to receiving the second input, re-apply the first adjustment filter to the at least one object.

5. The electronic device of claim 1, wherein the at least one processor is configured to:
   after removing application of the first adjustment filter from the at least one object, display a first indicator on the display indicating cancellation of the application of the first adjustment filter.

6. The electronic device of claim 1, wherein the at least one processor is configured to:
   after applying adjustment filters to each object, receive a third input for selecting the first object included in the second preview image; and
   in response to the third input, remove application of the second adjustment filter from the first object.

7. The electronic device of claim 1, wherein the applying of the first adjustment filter and the second adjustment filter includes visually changing at least one of a shape, form, color and size for each object.

8. The electronic device of claim 1, wherein the at least one processor is configured to:
   display a region of interest on the second preview image, the region of interest including the adjusted first object by the applied adjustment filters; and
   when receiving a drag input for resizing the region of interest such that the first object is excluded from the region of interest, remove application of the second adjustment filter from the adjusted first object.

9. The electronic device of claim 8, wherein the region of interest is displayed as at least one of a quadrangle and a closed curve.

10. The electronic device of claim 1, further comprising a memory, wherein the at least one processor is further configured to:
    store, in the memory, a capture image based on the second preview image including the plurality of objects adjusted based on adjustment filters including at least one of the first adjustment filter or the second adjustment filter;
    when the capture image is displayed on the display, display selectable icons corresponding to the adjustment filters applied to the plurality of objects; and
    in response to receiving a third input for selecting one of the selectable icons, alter the capture image by removing an adjustment filter from a particular captured object belonging to a particular category corresponding to the selected selectable icon.

11. A method for controlling an electronic device, the method comprising:
    displaying a first preview image acquired through a camera of the electronic device on a display of the electronic device, wherein the first preview image includes a plurality of objects;
    identifying, by at least one processor, a category for each object included in the first preview image, wherein at least one object of the plurality of objects is identified as a first category and a first object of the plurality of objects is identified as a second category;
    based on identifying the category for each object, applying a first adjustment filter corresponding to the first category to the at least one object, and applying a second adjustment filter corresponding to the second category to the first object;
    displaying, on the display, a second preview image including the at least one object visually adjusted based on the applied first adjustment filter and the first object visually adjusted based on the applied second adjustment filter;
    displaying, on the second preview image, a first selectable icon corresponding to the first category and a second selectable icon corresponding to the second category;
    receiving a first input for selecting the first selectable icon; and
    in response to receiving the first input, identifying the first category corresponding to the first selectable icon and removing application of the first adjustment filter from the adjusted at least one object based on the identified first category, while application of the second adjustment filter to the first object is maintained.

12. The method of claim 11, further comprising:

storing a plurality of reference images each corresponding to a plurality of categories in a memory of the electronic device, wherein the identifying of the category for each object comprises:

comparing each of the plurality of objects to the stored plurality of reference images to identify the category for each object based on a match with one of the plurality of reference images.

13. The method of claim 12, wherein each of the first adjustment filter and the second adjustment filter is selected based on a pre-association of an adjustment filter for each object with the category for each object.

14. The method of claim 11, further comprising:

after removing application of the first adjustment filter from the at least one object, receiving a second input for selecting the first selectable icon; and in response to receiving the second input, re-applying the first adjustment filter to the at least one object.

15. The method of claim 11, further comprising:

after removing application of the first adjustment filter from the at least one object, displaying a first indicator on the display indicating cancellation of the application of the first adjustment filter.

16. The method of claim 11, further comprising:

after applying adjustment filters to each object, receiving a third input for selecting the first object included in the second preview image; and in response to the third input, removing application of the second adjustment filter from the first object.

17. The method of claim 11, wherein the applying of the first adjustment filter and the second adjustment filter includes visually changing at least one of a shape, form, color and size for each object.

18. The method of claim 11, further comprising:

displaying in a region of interest on the second preview image, the region of interest including the adjusted first object by the applied adjustment filters; and when receiving a drag input for resizing the region of interest such that the first object is excluded from the region of interest, removing application of the second adjustment filter from the adjusted first object.

19. An electronic device comprising:

a display;

a camera; and at least one processor configured to be operatively connected to the camera and the display, wherein the at least one processor is configured to:

control the display to display an image acquired through the camera as a first preview image, wherein the first preview image includes a plurality of objects;

control the display to display, on the first preview image, a plurality of indicators associated with the plurality of objects respectively, wherein each of the plurality of indicators indicates that a respective object is adjustable based on a respective adjustment filter;

receive, by using the display, a first touch input on the first preview image;

based on receiving the first touch input, identify a first indicator closest to a position of the received first touch input among the plurality of indicators, and identify a first category of a first object associated with the identified first indicator;

control the display to display, on the first preview image, a first selectable icon corresponding to the identified first category;

receive, by using the display, a second touch input for selecting the first selectable icon;

based on receiving the second touch input, identify two or more objects, including the first object, associated with the identified first category, among the plurality of objects;

apply, to the identified two or more objects, an adjustment filter corresponding to the identified first category, among a plurality of adjustment filters; and control the display to display a second preview image including the two or more objects visually adjusted based on the applied adjustment filter.

20. The electronic device of claim 19, wherein the first indicator is displayed to be associated with each of the two or more objects, and wherein the first indicator indicates that the two or more objects are included in the first category to which the first object belongs.

* * * * *